(12) United States Patent
Iwamoto et al.

(10) Patent No.: US 10,222,836 B2
(45) Date of Patent: Mar. 5, 2019

(54) ELECTRONIC DEVICE

(71) Applicant: Panasonic Intellectual Property Management Co., Ltd., Osaka (JP)

(72) Inventors: Akira Iwamoto, Osaka (JP); Hitoshi Nakatani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 17 days.

(21) Appl. No.: 15/784,099

(22) Filed: Oct. 14, 2017

(65) Prior Publication Data

US 2018/0046222 A1 Feb. 15, 2018

Related U.S. Application Data

(63) Continuation of application No. PCT/JP2016/002136, filed on Apr. 21, 2016.

(30) Foreign Application Priority Data

Apr. 23, 2015 (JP) ................................. 2015-088723

(51) Int. Cl.
 *G06F 1/16* (2006.01)
(52) U.S. Cl.
 CPC .......... *G06F 1/1654* (2013.01); *G06F 1/1616* (2013.01); *G06F 1/1618* (2013.01); *G06F 1/1632* (2013.01); *G06F 1/1635* (2013.01); *G06F 1/1681* (2013.01); *G06F 1/169* (2013.01); *G06F 1/1683* (2013.01)
(58) Field of Classification Search
 CPC .... G06F 1/1632; G06F 1/1635; G06F 1/1681; G06F 1/169; G06F 1/1616; G06F 1/1656; G06F 1/1654; G06F 1/1679; G06F 3/0202; G06F 1/1677; G06F 3/03547; G06F 1/1618; G06F 1/00; G06F 1/16; G06F 1/1613; G06F 1/1683; H05K 5/0017; H05K 5/0221; H05K 5/03
See application file for complete search history.

(56) References Cited

U.S. PATENT DOCUMENTS

| | | | | |
|---|---|---|---|---|
| 5,262,759 A | * | 11/1993 | Moriconi | G06F 1/1616 |
| | | | | 361/679.29 |
| 5,790,375 A | | 8/1998 | Lee | |
| 5,959,835 A | * | 9/1999 | Dohi | G06F 1/1632 |
| | | | | 361/679.41 |

(Continued)

FOREIGN PATENT DOCUMENTS

| | | |
|---|---|---|
| CA | 2437537 A1 | 2/2005 |
| JP | 09-006475 A | 1/1997 |

(Continued)

*Primary Examiner* — Dimary S Lopez Cruz
*Assistant Examiner* — Ingrid D Wright
(74) *Attorney, Agent, or Firm* — Renner Otto Boisselle & Sklar, LLP

(57) ABSTRACT

An electronic device includes a first unit and a second unit including a display and a central processing unit. The first unit and the second unit are detachably coupled. The first unit and the second unit are configured that, when coupled to each other, a housing of the second unit and a predetermined portion of the first unit adjoin. At the adjoining portion, locking-target holes that can be locked together by a single locking projection of a mounting apparatus are provided.

3 Claims, 21 Drawing Sheets

(56) References Cited

U.S. PATENT DOCUMENTS

| | | | | |
|---|---|---|---|---|
| 6,980,420 | B2 * | 12/2005 | Maskatia | G06F 1/1616 |
| | | | | 248/917 |
| 9,137,913 | B2 * | 9/2015 | Hsu | H05K 5/0221 |
| 2003/0231464 | A1 * | 12/2003 | Weng | G06F 1/1632 |
| | | | | 361/679.41 |
| 2004/0246666 | A1 * | 12/2004 | Maskatia | G06F 1/1616 |
| | | | | 361/679.57 |
| 2005/0111171 | A1 * | 5/2005 | Kamimaki | E05B 73/0082 |
| | | | | 361/679.55 |
| 2008/0165492 | A1 * | 7/2008 | Ward | G06F 1/1624 |
| | | | | 361/679.37 |
| 2013/0286299 | A1 | 10/2013 | Sato | |

FOREIGN PATENT DOCUMENTS

| | | |
|---|---|---|
| JP | 2000-137542 A | 5/2000 |
| JP | 2003-241853 A | 8/2003 |
| JP | 2013-231839 A | 11/2013 |
| WO | WO 2009/098780 A1 | 8/2009 |

* cited by examiner

TOP
FRONT ← → REAR
BOTTOM

ELECTRONIC DEVICE

BACKGROUND

1. Technical Field

The present disclosure relates to an electronic device including a first housing and a second housing detachable from each other.

2. Description of the Related Art

Unexamined Japanese Patent Publication No. H09-6475 discloses a docking station (a mounting apparatus) capable of mounting a laptop computer (an electronic device). An ordinary laptop computer includes a first housing including a keyboard and a central processing unit, and a second housing including a display. The first housing and the second housing are coupled to each other so as to be relatively revolvable about a first revolving axis center. The docking station according to Unexamined Japanese Patent Publication No. H09-6475 includes a mount on an upper face of a case (a housing), onto which the first housing is to be mounted. The mount includes a hook member (a locking member) that can be locked to a locking-target hole on a bottom face of the first housing of the laptop computer. The locking member can move, when an operating member is operated, between a locked state in which the locking member is locked to the locking-target hole and an unlocked state in which the locking member is not locked to the locking-target hole.

SUMMARY

The present disclosure has an object to achieve enhanced security against theft of an electronic device including a first housing and a second housing detachable from each other.

The electronic device according to the present disclosure includes a first unit and a second unit including a display and a central processing unit. The first unit and the second unit are detachably coupled. The first unit and the second unit are configured, when coupled to each other, so that a housing of the second unit and a predetermined portion of the first unit adjoin. At the adjoining portion, the units are each provided with a locking-target hole that can together be locked by a single locking projection of a predetermined mounting apparatus.

In the electronic device according to the present disclosure, both of the first unit and the second unit can be locked by the single locking projection of the predetermined mounting apparatus. By locking the electronic device mounted on the mounting apparatus, both of the first unit and the second unit can therefore be unremovable. Accordingly, in the electronic device where the first unit and the second unit are separable from each other, enhanced security against theft can be achieved.

In the electronic device according to the present disclosure, when locking the electronic device to the mounting apparatus, a user is not required to lock the first unit and the second unit. Accordingly, improved user friendliness can be achieved.

DETAILED DESCRIPTION

Exemplary embodiments will be described herein in detail with reference to the drawings appropriately. However, detailed descriptions more than necessary might be sometimes omitted. For example, in some cases, detailed description of already well-known items and repeated description with respect to substantially the same configuration will be omitted. These omissions are made to avoid unnecessary redundancy of the following description and to facilitate the understanding of those skilled in the art.

Note that the inventors of the present disclosure provide the accompanying drawings and the following description in order to allow those skilled in the art to fully understand the present disclosure, and do not intend to limit the subject matter as described in the appended claims.

BACKGROUND OF THE PRESENT DISCLOSURE

Since electronic devices including laptop computers are to be recorded with various important information, enhanced security against theft has been demanded. Allowing the docking station according to Unexamined Japanese Patent Publication No. H09-6475 described above to achieve locking in a latched state can make the laptop computer to be unremovable.

A laptop computer available in recent years may have however been configured to include a first housing including a keyboard, and a second housing including a display and a central processing unit so that the first housing and the second housing including the display and the central processing unit are separable from each other. The second housing can therefore be used as a tablet computer. Applying the technology of Unexamined Japanese Patent Publication No. H09-6475 to such a laptop computer (electronic device) causes, although a first housing is fixed to a docking station, a second housing recorded with important information to be removable.

Applying a locking structure similar to a locking structure of the first housing to the second housing can accordingly make the second housing to be unremovable. In this case, however, a user is required to perform operations to respectively lock or unlock the first housing and the second housing.

In view of the above described problems, the present disclosure provides a mounting apparatus capable of achieving enhanced security against theft, even when an electronic device to be mounted on a mount is configured so that a first housing and a second housing are separable from each other. The present disclosure also provides a mounting apparatus and an electronic device, in which a first housing and a second housing can both be locked or unlocked through a single operation.

First Exemplary Embodiment

A first exemplary embodiment will be described herein with reference to the drawings.

[1. Configuration]

[1-1. Outline of Mounting Apparatus]

Figure 1:
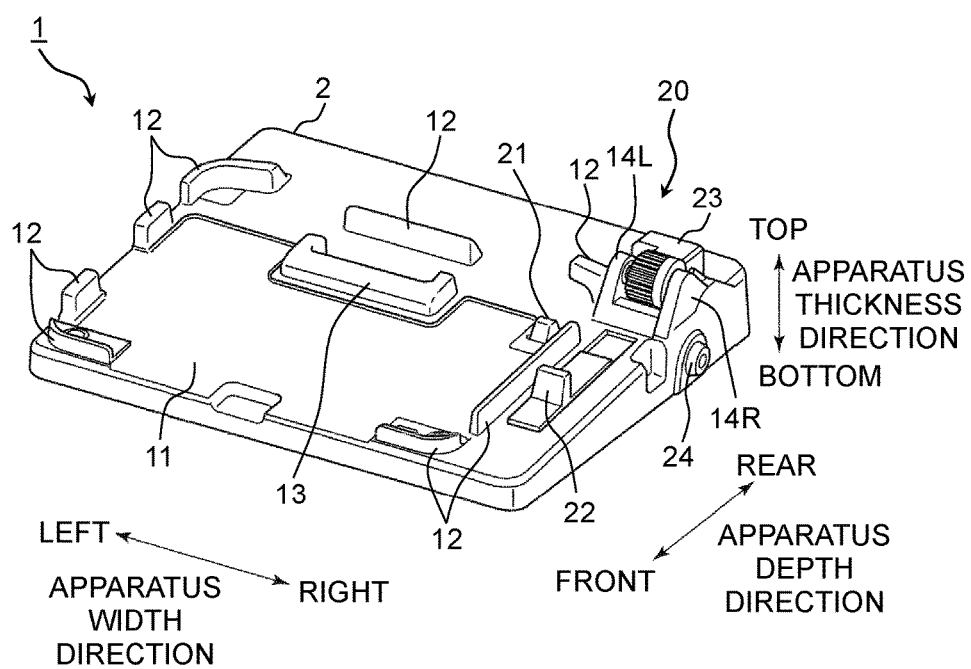
FIG. 1 is a perspective view of a mounting apparatus according to a first exemplary embodiment of the present disclosure.
Figure 2:
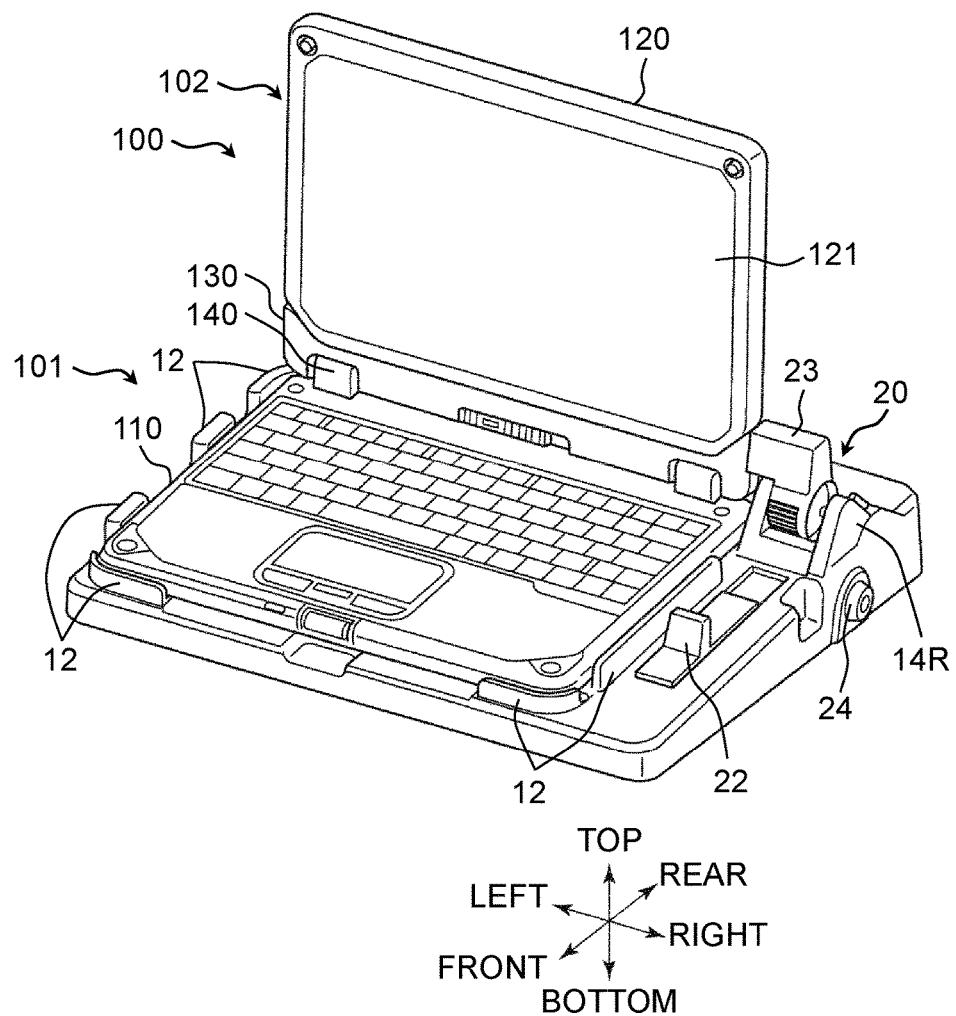
FIG. 2 is a perspective view of the mounting apparatus according to the first exemplary embodiment of the present disclosure, on which an electronic device is mounted.

FIG. 1 is a perspective view of a mounting apparatus according to the first exemplary embodiment of the present disclosure. FIG. 2 is a perspective view of the mounting apparatus according to the first exemplary embodiment of the present disclosure, on which an electronic device is mounted.

Mounting apparatus 1 according to this exemplary embodiment is, for example, fixed to a dashboard of a vehicle for use. Mounting apparatus 1 has, as shown in FIG. 1, a flat stand shape. An upper face of housing 2 of mounting apparatus 1 is provided with mount 11 for mounting the electronic device. As shown in FIG. 2, by operating cylinder lock 24 when electronic device 100 is mounted on mount 11, electronic device 100 can be locked to mounting apparatus 1 so as to be unremovable. Specifically, by operating cylinder lock 24, second housing 120 of electronic device 100 is locked by locking member 23.

Mounting apparatus 1 can be fixed to a vehicle using, for example, fastening members such as bolts and screws. Fixation using a fastening member may be performed at a position that cannot easily be accessed externally, or fixation may be performed with an aspect where the fixation can only be released by using a special tool. Mounting apparatus 1 itself will not therefore be able to easily be removed from the vehicle. Mounting apparatus 1 may be fixed to a structure or a desk in a company or a home, instead of a vehicle.

As shown in FIG. 1, a width direction of the apparatus (hereinafter referred to as an "apparatus width direction"), a depth direction of the apparatus (hereinafter referred to as an "apparatus depth direction"), and a thickness direction of the apparatus (hereinafter referred to as an "apparatus thickness direction") are in here defined. The apparatus thickness direction refers to a direction approximately vertical to a main face of mount 11 of mounting apparatus 1, where a direction of a side to which electronic device 100 is to be mounted refers to "top," while an opposite direction refers to "bottom." The apparatus depth direction refers to a direction orthogonal to the apparatus thickness direction, i.e., a direction vertical to display 121 of electronic device 100 when mounting apparatus 1 is mounted with electronic device 100 (when first housing 110 is open 90 degrees with respect to second housing 120) as shown in FIG. 2, where a direction of a side to which a display face of display 121 faces refers to "front," while an opposite direction refers to "rear." The apparatus width direction refers to a direction vertical to both of the apparatus depth direction and the apparatus thickness direction, where a "left" direction when display 121 of electronic device 100 is viewed from "front" in the apparatus depth direction refers to "left," while an opposite direction refers to "right." These definitions have merely been set for convenience and easy understanding of configurations of mounting apparatus 1 and the electronic device, and do not limit conditions including absolute arrangements of components. In and after FIG. 2, "front," "rear," "top," "bottom," "left," and "right" based on the above described definitions of the directions are shown.

A configuration of electronic device 100 to be mounted on mounting apparatus 1 will first be described herein, and a configuration of mounting apparatus 1 will then be described herein.

[1-2. Configuration of Electronic Device]

Figure 3A:
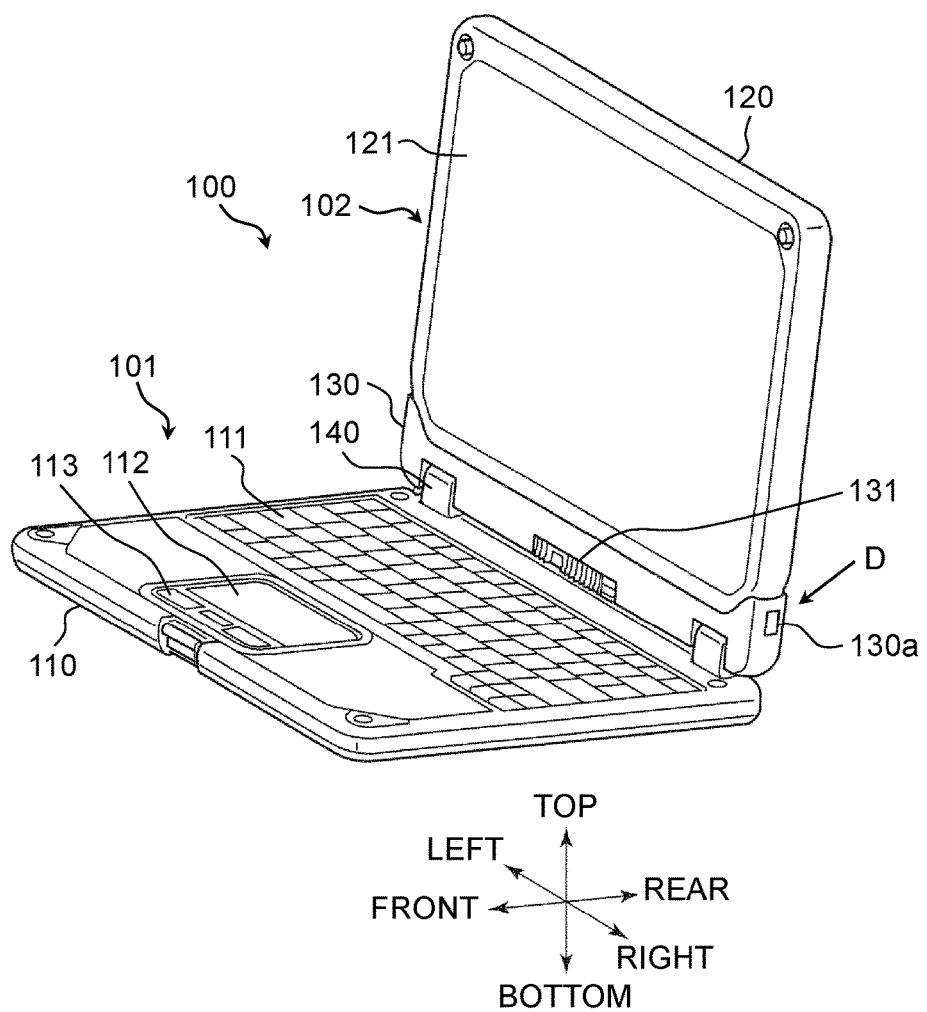
FIG. 3A is a perspective view of the electronic device to be mounted on the mounting apparatus according to the first exemplary embodiment of the present disclosure.
Figure 3B:
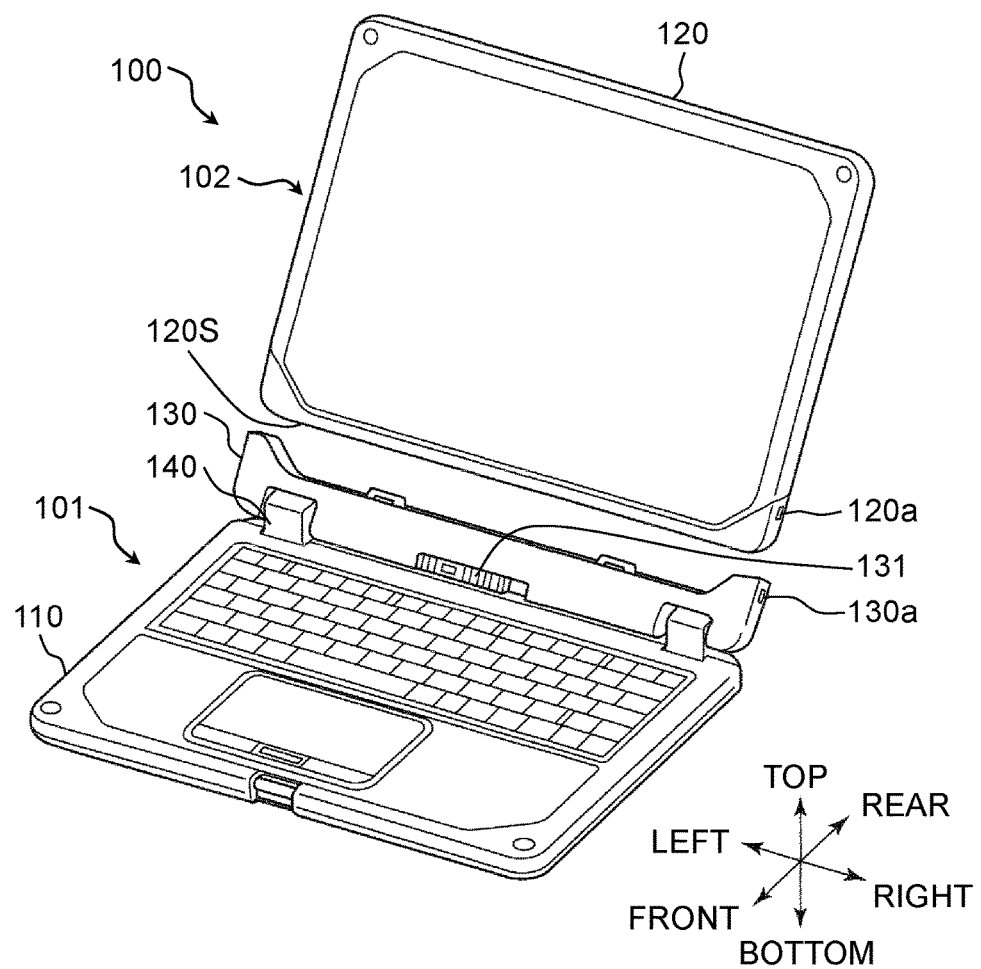
FIG. 3B is a perspective view of the electronic device to be mounted on the mounting apparatus according to the first exemplary embodiment of the present disclosure, when separated into a first unit and a second unit.

FIG. 3A is a perspective view of the electronic device to be mounted on the mounting apparatus according to the first exemplary embodiment of the present disclosure. FIG. 3B is a perspective view of the electronic device to be mounted on the mounting apparatus according to the first exemplary embodiment of the present disclosure, when separated into a first unit and a second unit.

As shown in FIG. 3A, electronic device 100 includes first unit 101 and second unit 102. Second unit 102 and first unit 101 are detachable, and therefore electronic device 100 is configured as a so-called detachable computer. FIGS. 3A and 3B are the perspective views of electronic device 100 according to this exemplary embodiment. Specifically, FIG. 3A illustrates second unit 102 and first unit 101 attached to each other, and FIG. 3B illustrates second unit 102 and first unit 101 detached from each other.

Second unit 102 is a tablet computer. Second unit 102 includes display 121. Display 121 is, for example, a liquid crystal panel. Display 121 is also a touch panel capable of accepting a touch operation performed by a user. Second unit 102 is incorporated with a central processing unit (CPU), a volatile storage device (RAM), a non-volatile storage device (e.g., ROM and SSD), a battery, and other components. The non-volatile storage device (e.g., ROM and SSD) contains, for example, an operating system (OS), various application programs, and various data. The central processing unit (CPU) reads the OS, the application programs, and the various data, and executes arithmetic processing to achieve various functions.

First unit 101 includes input portions allowing a user to execute input processing, and is detachable with respect to second unit 102. First unit 101 includes first housing 110, socket 130, and hinges 140.

First housing 110 is formed of, for example, a metal such as a magnesium alloy or a resin. A main face (a side facing front in the apparatus thickness direction) of first housing 110 is provided with the input portions, as described above, including keyboard 111, touch pad 112, and a plurality of operation buttons 113.

Socket 130 is capable of accommodating side 120S lying on a lower side in a top-bottom direction of second housing 120 of second unit 102 (hereinafter appropriately referred to as "lower side 120S").

Hinges 140 couple a side of first housing 110, which faces rear in the apparatus depth direction, and a side on a lower of socket 130 so that first housing 110 and socket 130 are relatively revolvable. Hinges 140 each have revolving axis center AX parallel to a width direction of electronic device 100. Hinges 140 are capable of holding second unit 102 and first unit 101 opening each other, for example, as illustrated in FIG. 3A, at an angle of approximately 90 degrees. Hinges 140 enable second housing 120 of second unit 102 to close with respect to first housing 110 of first unit 101 (in a state where a main face of second housing 120 and the main face of first housing 110 face close each other to be almost parallel).

Socket 130 is provided with a connector (not shown) to be connected to a connector (not shown) of second housing 120 while lower side 120S of second housing 120 is being accommodated. Via these connectors, various signals and electric power can be exchanged between second unit 102 and first unit 101. For example, signals output from the input portions, such as keyboard 111, touch pad 112, and the plurality of operation buttons 113, of first housing 110 of first unit 101 can be output to second unit 102. Second unit 102 can receive these signals to perform controls based on the received signals. Accordingly, electronic device 100 can be used as a laptop computer when first unit 101 and second unit 102 are attached to each other. Single second unit 102 may be used as a tablet computer.

[1-3. Configuration of Mounting Apparatus]

The configuration of mounting apparatus 1 will now be described herein with reference to FIGS. 4A, 4B, in addition to FIG. 1 described above.

Figure 4A:
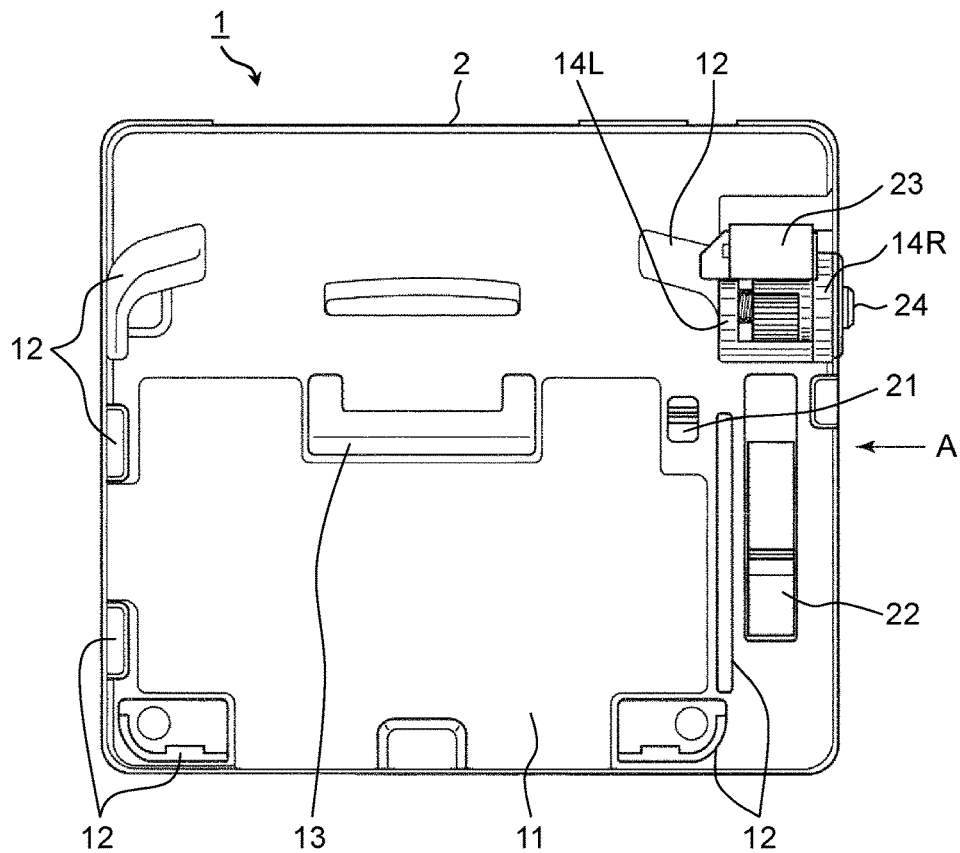
FIG. 4A is a plan view of the mounting apparatus according to the first exemplary embodiment of the present disclosure.
Figure 4B:
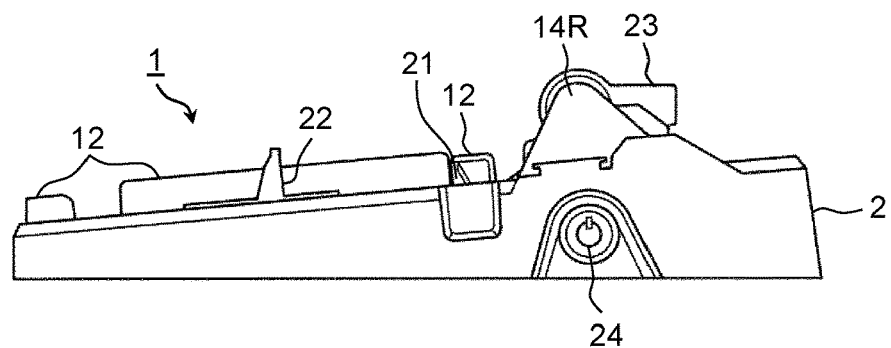
FIG. 4B is a side view of the mounting apparatus according to the first exemplary embodiment of the present disclosure (the side view when viewed in a direction of arrow A shown in FIG. 4A)

FIG. 4A is a plan view of the mounting apparatus according to the first exemplary embodiment of the present disclosure. FIG. 4B is a side view of the mounting apparatus according to the first exemplary embodiment of the present disclosure (the side view when viewed in a direction of arrow A shown in FIG. 4A).

As shown in these views, mounting apparatus 1 has a stand shape. On the upper face of housing 2 of mounting apparatus 1, mount 11 is provided for mounting electronic device 100. A plurality of projections 12 projecting upward is provided around mount 11 so as to intermittently surround side faces of first housing 110 of electronic device 100 to be mounted.

Biasing projection member 13 is provided adjacent to a center of mount 11 in a width direction. Biasing projection member 13 is supported by housing 2 so as to be movable in the apparatus thickness direction (the top-bottom direction) between a first position at which its top end projects upward by a predetermined amount from an upper face of mount 11 (a position shown in FIG. 1) and a second position evacuated downward from the upper face of mount 11. Biasing projection member 13 is biased toward the first position (upward) by a spring member (not shown). Biasing projection member 13 and the spring member assist a user for lifting upward and removing the electronic device that is a heavy object from mount 11.

To right of mount 11, lock mechanism 20 for locking and fixing electronic device 100 mounted on mount 11 is provided. A configuration of lock mechanism 20 will be described later in detail.

Figure 5A:
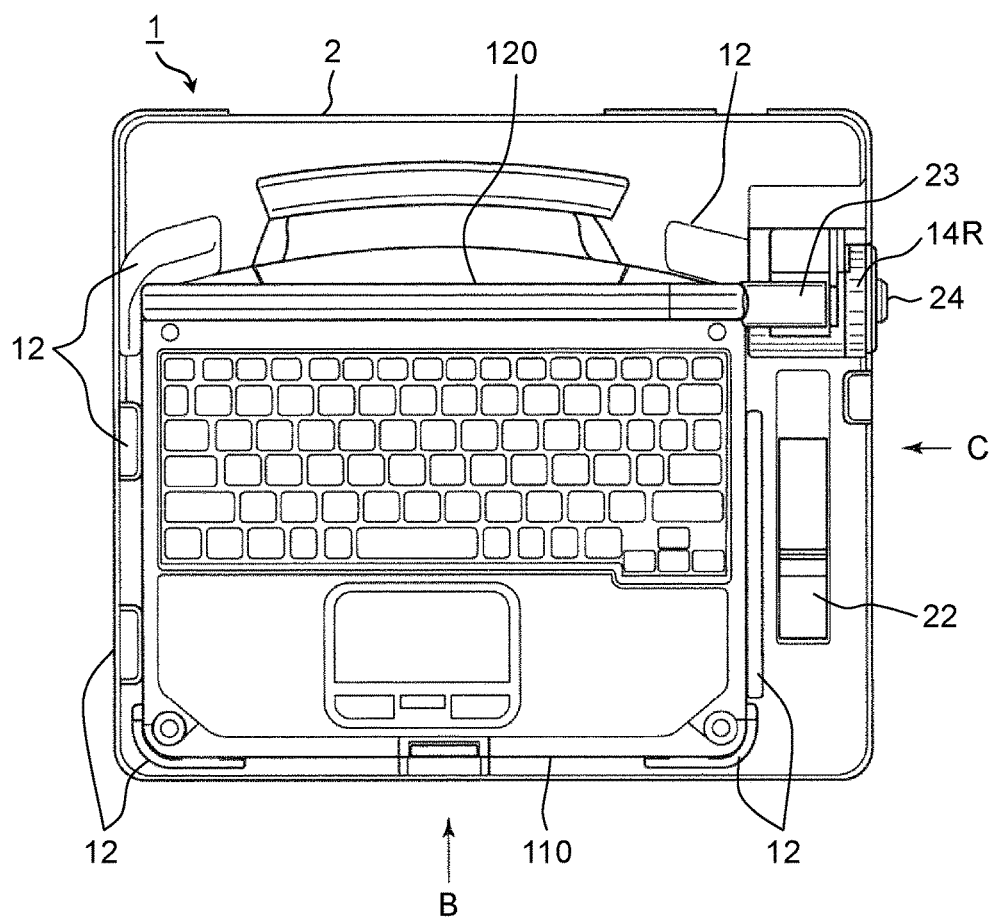
FIG. 5A is a plan view of the mounting apparatus according to the first exemplary embodiment of the present disclosure, on which the electronic device is mounted.
Figure 5B:
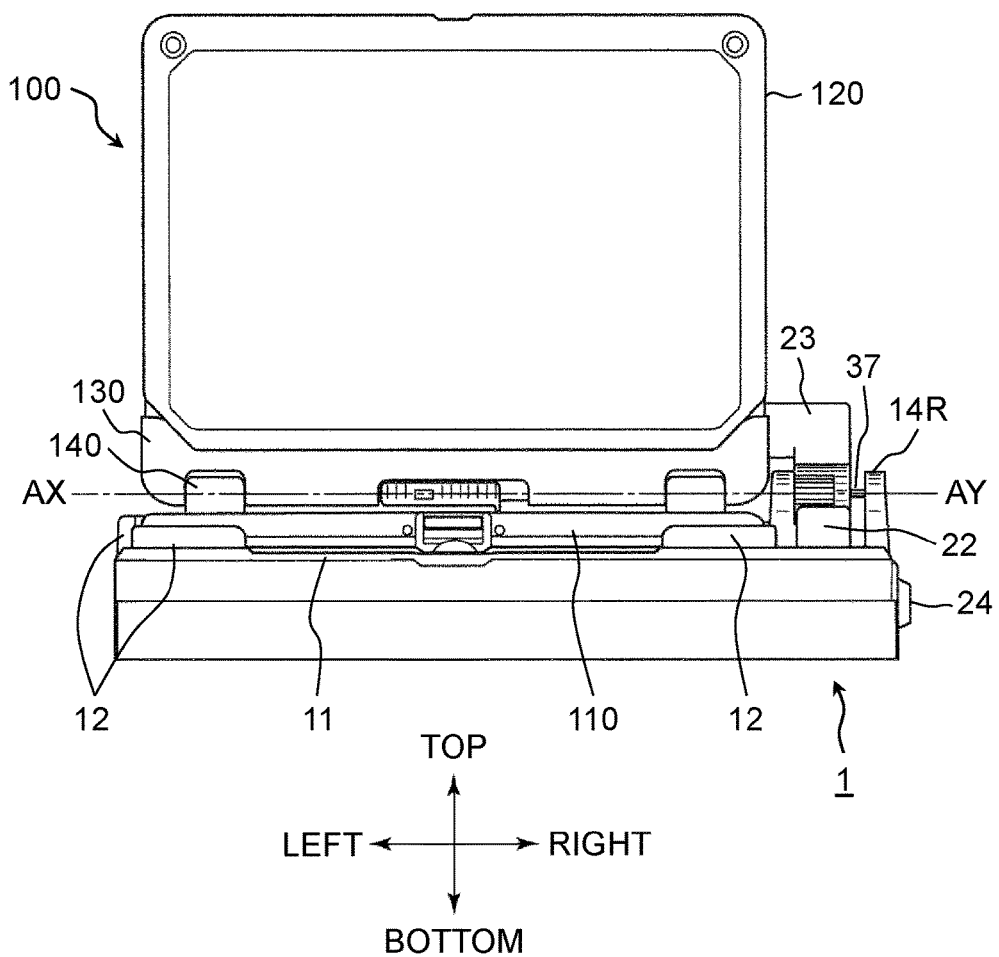
FIG. 5B is a front view of the mounting apparatus according to the first exemplary embodiment of the present disclosure, on which the electronic device is mounted (the front view when viewed in a direction of arrow B shown in FIG. 5A)
Figure 5C:
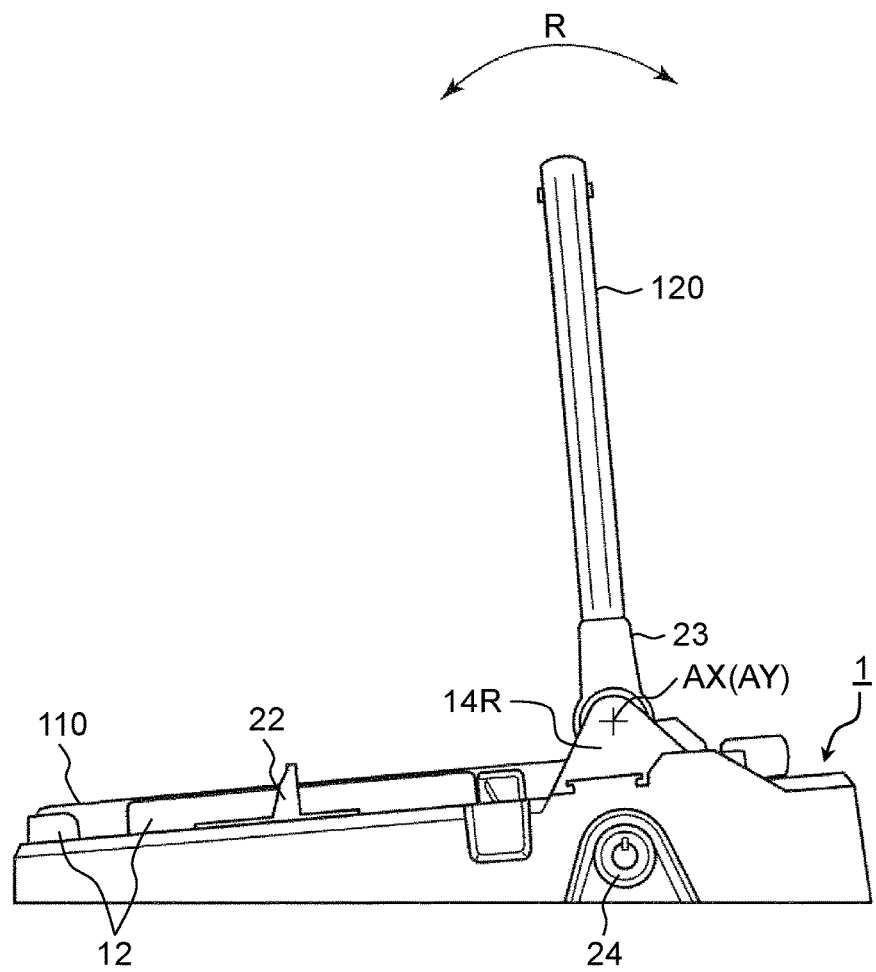
FIG. 5C is a side view of the mounting apparatus according to the first exemplary embodiment of the present disclosure, on which the electronic device is mounted (the side view when viewed in a direction of arrow C shown in FIG. 5A)

FIG. 5A is a plan view of the mounting apparatus according to the first exemplary embodiment of the present disclosure, on which the electronic device is mounted. FIG. 5B is a front view of the mounting apparatus according to the first exemplary embodiment of the present disclosure, on which the electronic device is mounted (the front view when viewed in a direction of arrow B shown in FIG. 5A). FIG. 5C is a side view of the mounting apparatus according to the first exemplary embodiment of the present disclosure, on which the electronic device is mounted (the side view when viewed in a direction of arrow C shown in FIG. 5A).

As shown in FIGS. 5A, 5B, and 2 described above, when electronic device 100 is mounted on mounting apparatus 1, first housing 110 of electronic device 100 is intermittently surrounded by the plurality of projections 12 disposed around mount 11. In this mounted state, first housing 110 is therefore restricted from moving in the apparatus width direction and the apparatus depth direction. In other words, first housing 110 of electronic device 100 is only mountable on mount 11 in a predetermined positional relationship.

Second housing 120 of electronic device 100 mounted on mounting apparatus 1 is configured to be locked, on its side facing right in the apparatus width direction, with locking member 23 described later. When electronic device 100 is mounted on mounting apparatus 1, and locking member 23 is locked to second housing 120, locking member 23 restricts second housing 120 from moving toward the apparatus thickness direction and the apparatus depth direction. Lower side 120S of second housing 120 is fitted to socket 130 so that socket 130 covers lower side 120S from front, rear, left, and right. Movements of second housing 120 in the apparatus width direction are therefore also restricted. Accordingly, movements of electronic device 100 in all directions are restricted.

[1-3. Lock Mechanism]

Lock mechanism 20 includes movable projection member 21, operating member 22, locking member 23, and cylinder lock 24. Lock mechanism 20 also includes a moving mechanism for driving locking member 23 in response to movements of movable projection member 21, operating member 22, and cylinder lock 24. Prior to specifically describing configurations of these members and the moving mechanism, a locking structure between locking member 23 of mounting apparatus 1 and second housing 120 of electronic device 100 will first be described herein.

[1-3-1. Locking Structure Between Locking Member of Mounting Apparatus and Second Housing of Electronic Device]

Figure 6A:
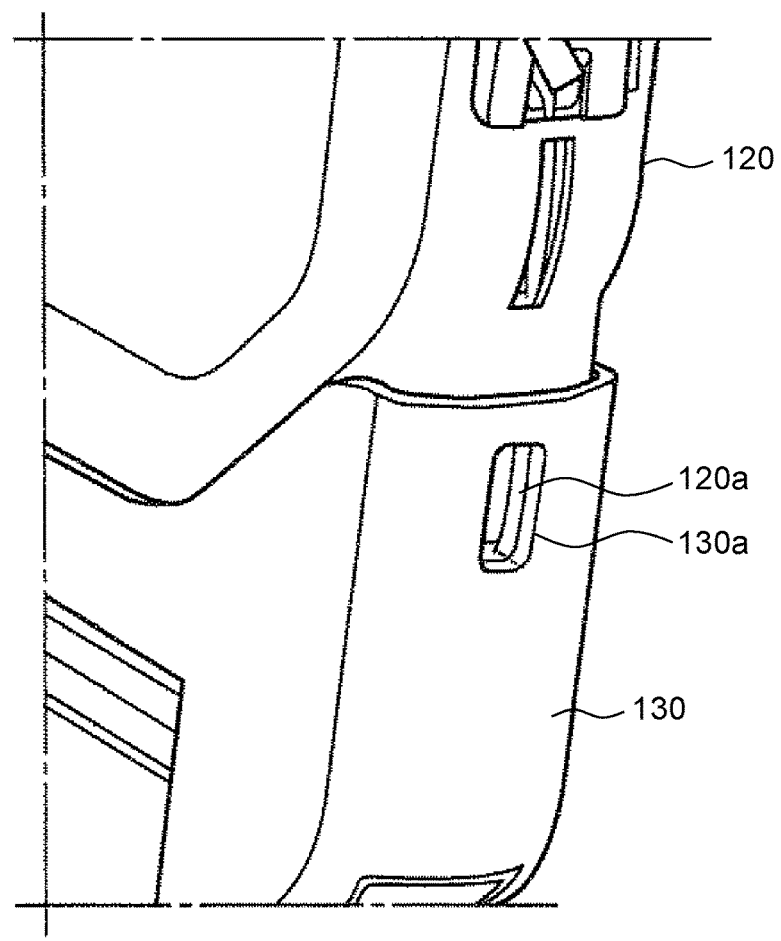
FIG. 6A is an enlarged perspective view of locking-target holes of the electronic device mounted on the mounting apparatus according to the first exemplary embodiment of the present disclosure (the enlarged perspective view when viewed in a direction of arrow D shown in FIG. 3A)
Figure 6A:
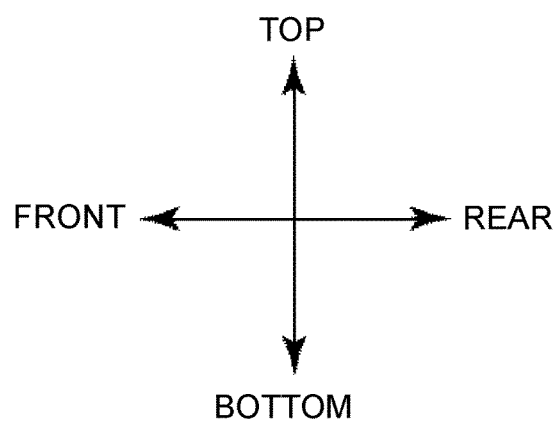

FIG. 6A is an enlarged perspective view of locking-target holes of the electronic device mounted on the mounting apparatus according to the first exemplary embodiment of the present disclosure (the enlarged perspective view when viewed in a direction of arrow D shown in FIG. 3A). As shown in FIGS. 6A and 3B described above, second housing 120 of the electronic device has locking-target hole 120a at a lower on a right side. Socket 130 of first housing 110 of the electronic device has locking-target hole 130a on an upper of a right side. Locking-target hole 120a of second housing 120 and locking-target hole 130a of socket 130 are formed at positions overlapping to each other when viewed in a direction parallel to revolving axis centers AX of hinges 140 while second housing 120 is attached to socket 130.

Figure 6B:
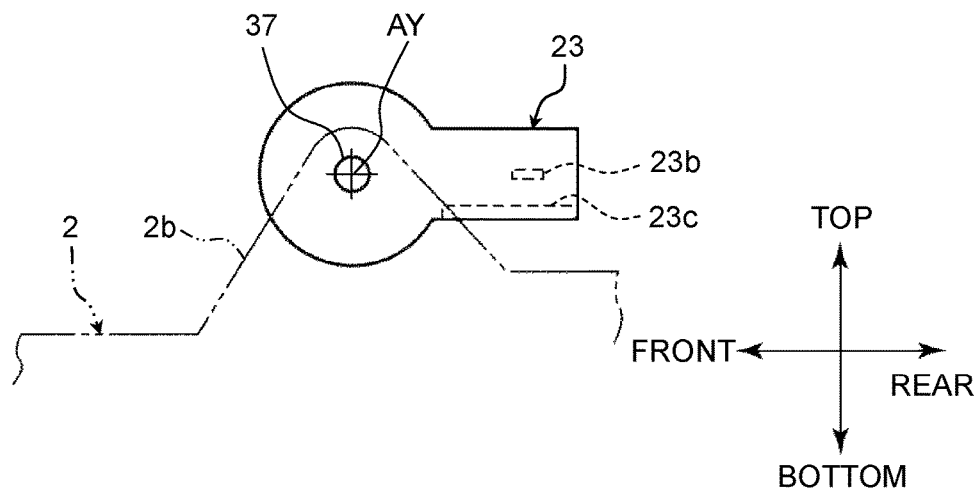
FIG. 6B is a side view of an area around a locking member of a lock mechanism of the mounting apparatus according to the first exemplary embodiment of the present disclosure (a partially simplified enlarged view of the area around the locking member shown in FIG. 5C)
Figure 6C:
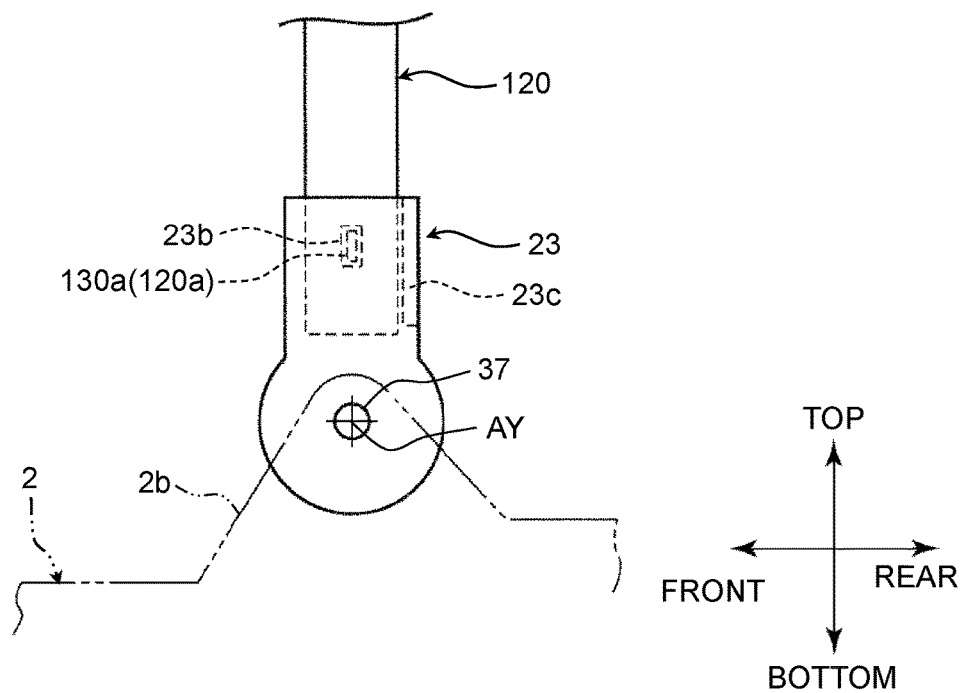
FIG. 6C is a side view of the area around the locking member of the lock mechanism of the mounting apparatus according to the first exemplary embodiment of the present disclosure (a partially simplified enlarged view of the area around the locking member shown in FIG. 5C)
Figure 6D:
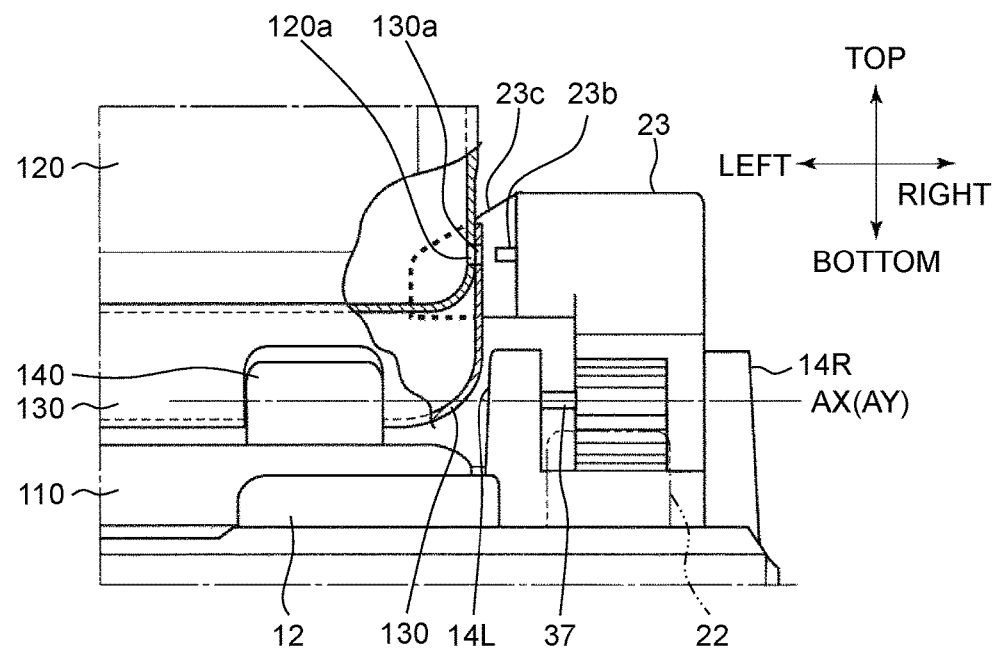
FIG. 6D is a front view of an area around the locking member of the lock mechanism of the mounting apparatus according to the first exemplary embodiment of the present disclosure (a partially breakaway enlarged view of the area around the locking member shown in FIG. 5B)
Figure 6E:
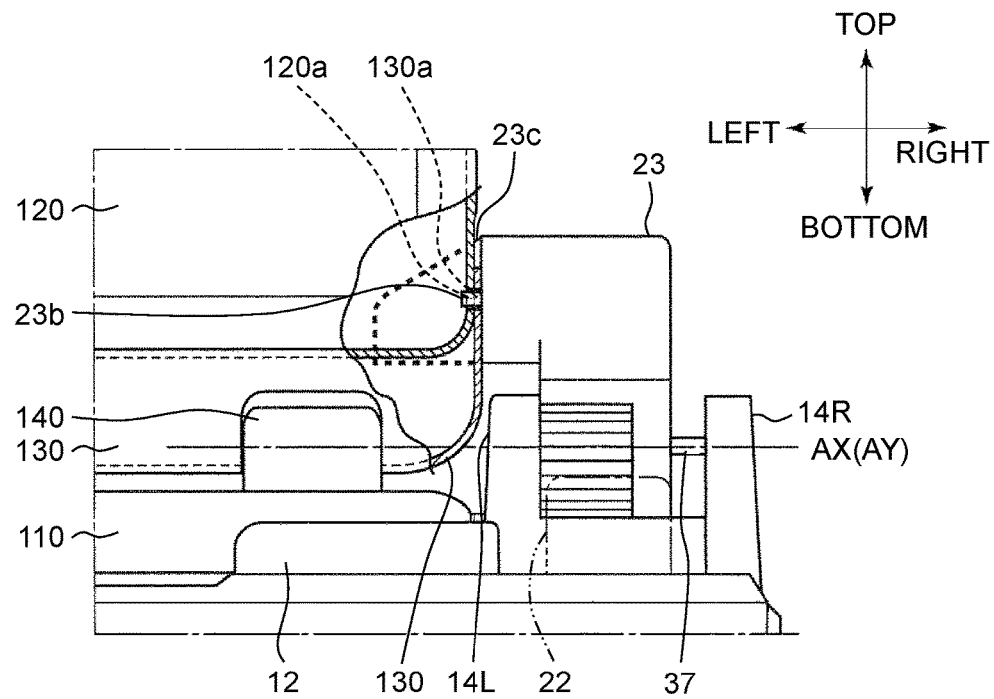
FIG. 6E is a front view of the area around the locking member of the lock mechanism of the mounting apparatus according to the first exemplary embodiment of the present disclosure (a partially breakaway enlarged view of the area around the locking member shown in FIG. 5B)

FIGS. 6B and 6C are side views of an area around the locking member of the lock mechanism of the mounting apparatus according to the first exemplary embodiment of the present disclosure (partially simplified enlarged views of the area around the locking member shown in FIG. 5C). FIGS. 6D and 6E are front views of an area around the locking member of the lock mechanism of the mounting apparatus according to the first exemplary embodiment of the present disclosure (partially breakaway enlarged views of the area around the locking member shown in FIG. 5B).

Locking member 23 is configured to be revolvable by housing 2 about second shaft 37 extending in the apparatus width direction. Locking member 23 is revolvable between an initial position and a locking-target hole side position when electronic device 100 is mounted on mounting apparatus 1. Revolving axis center AY of second shaft 37 lies on a line extending from revolving axis centers AX of hinges 140. In other words, revolving axis center AY of second shaft 37 and revolving axis centers AX of hinges 140 lie on a single axis center.

Locking member 23 is configured to be movable in parallel to a direction of revolving axis center AY of second shaft 37. Locking member 23 is biased in a direction toward which locking member 23 revolves counterclockwise about second shaft 37 when mounting apparatus 1 is viewed from right.

Locking member 23 includes main body portion 23a, locking projection 23b, and abutting portion 23c.

Main body portion 23a has a lever shape having an end revolvably supported by second shaft 37.

Locking projection 23b is a projection projecting inward in the apparatus width direction from a side of main body portion 23a, which faces inward in the apparatus width direction. Locking projection 23b has a shape and a size that can be locked to locking-target hole 120a of second housing 120 and locking-target hole 130a. The size of locking projection 23b and sizes of locking-target holes 120a, 130a may be sizes that create a gap between locking projection 23b and locking-target holes 120a, 130a when locking projection 23b is locked to locking-target hole 120a of second housing 120 and locking-target hole 130a. Allowing a gap to be created can lock locking projection 23b and locking-target holes 120a, 130a even if revolving axis center AY of second shaft 37 and revolving axis centers AX of hinges 140 do not fully lie on a single axis center, in other words, revolving axis center AY of second shaft 37 and revolving axis centers AX of hinges 140 lie on an approximately identical axis center. Increasing a gap in size allows second housing 120 and locking member 23 to revolve together while locking projection 23b is locked to locking-target hole 120a of second housing 120 and locking-target hole 130a, even if a degree of integrity in a single axis center lowers.

Abutting portion 23c extends in the apparatus width direction from an end of main body portion 23a, a position of which faces inward in the apparatus width direction and lies at a rear in the apparatus depth direction.

As will be described later in detail, when locking member 23 revolves about shaft portion 61, abutting portion 23c abuts a back of second housing 120, and, at this time, locking projection 23b of locking member 23 lies outside of locking-target hole 120a of second housing 120 and locking-target hole 130a in the apparatus width direction. At this time, when a key is used to revolve cylinder lock 24 to a locked state, abutting portion 23c moves inward in the apparatus width direction, and thus locking projection 23b of locking member 23 and locking-target hole 120a of second housing 120 and locking-target hole 130a are locked to each other.

Lock mechanism 20 includes, as described above, movable projection member 21, operating member 22, locking member 23, cylinder lock 24, and the moving mechanism (details will be described later).

Movable projection member 21 is provided in a vertical through hole formed on mount 11 so as to be vertically movable between an upward projection position and an evacuation position. The "upward projection position" refers to a position at which a top end of movable projection member 21 projects upward by a predetermined amount from the upper face of mount 11 (the positions shown in FIGS. 1, 7C). The "evacuation position" refers to a position at which movable projection member 21 evacuates downward from the upper face of mount 11 (the position shown in FIG. 9A). Movable projection member 21 includes, at a rear in the apparatus depth direction, vertical wall 21a facing rear in the apparatus depth direction.

Operating member 22 is fixed to movable plate 51 described later with screws or another fixing members so as to be movable in the apparatus depth direction. Operating member 22 is a member operated by a user to revolve locking member 23 from a locking-target hole side position or another position to the initial position, in other words, to return to the initial position. A "locking-target hole side position" refers to a position at which operating member 22 has revolved about second shaft 37 of locking member 23, as shown in FIG. 6C, as well as to a position at which locking-target hole 120a of second housing 120 and locking-target hole 130a of socket 130 of electronic device 100 mounted on mount 11 and locking projection 23b of locking member 23 overlap when viewed in the apparatus width direction. A "locking-target hole side position" changes in accordance with a position at which second housing 120 of electronic device 100 has revolved. By allowing locking member 23 to move in the apparatus width direction when locking member 23 lies on a locking-target hole side position, locking projection 23b of locking member 23 can be locked to locking-target hole 120a and locking-target hole 130a of socket 130. The "initial position" refers to a position to which locking member 23 revolves about second shaft 37, as shown in FIG. 6B, as well as to a position at which locking member 23 is inclined behind second shaft 37 in an angle of approximately 90 degrees with respect to the apparatus thickness direction (the top-bottom direction), and locking member 23 can no longer revolve clockwise (when viewed from right in the apparatus width direction to left). Impossibility of revolving is caused when vertical wall 21a of movable projection member 21 and a front end of gear member 32 described later abut each other.

Cylinder lock 24 is a lock into which a key can be inserted to rotate shaft portion 61 by 90 degrees.

The moving mechanism includes first moving mechanism 30, second moving mechanism 50, and third moving mechanism 60. The moving mechanisms will now be described herein in detail.

[1-3-3. First Moving Mechanism]

Figure 7A:
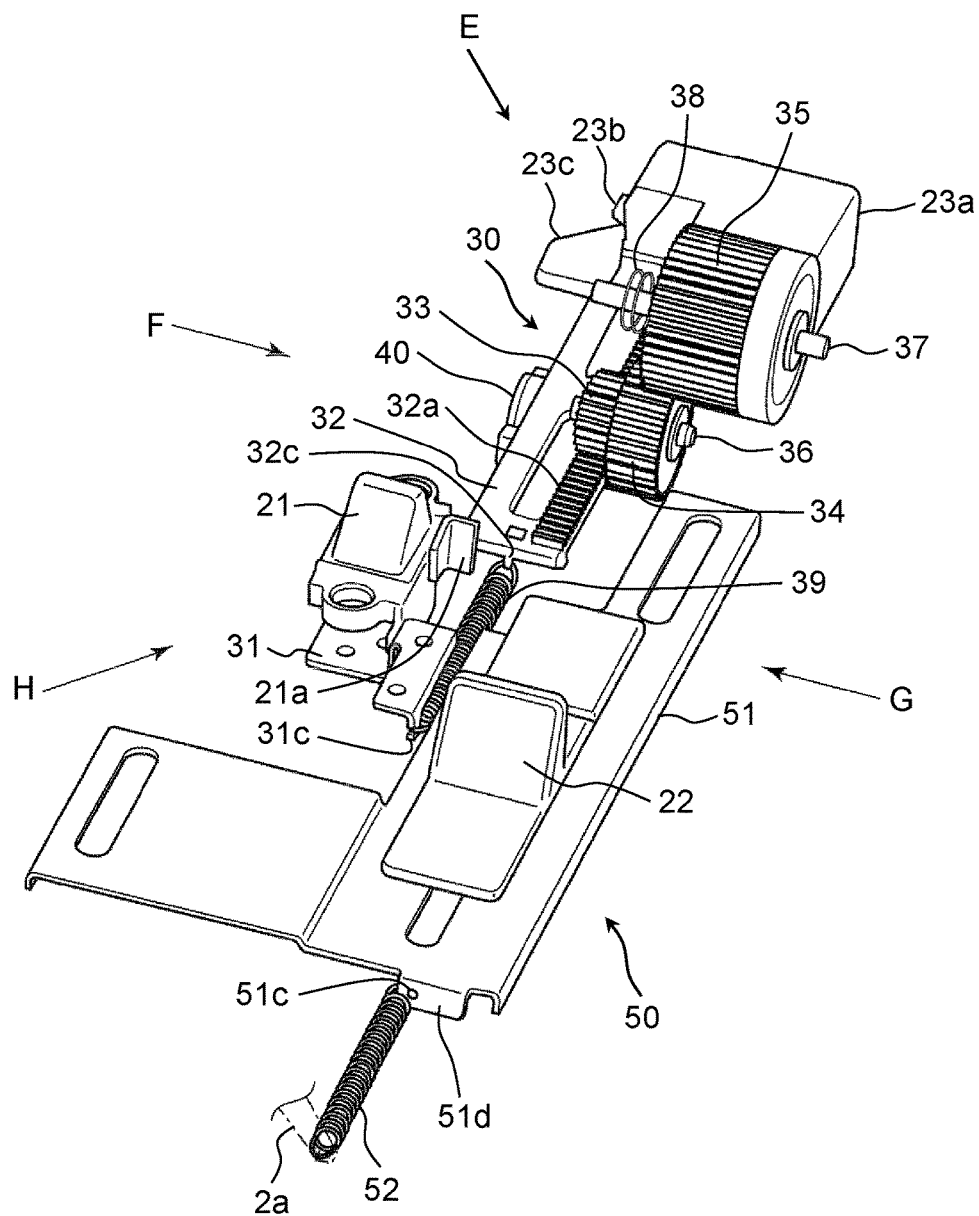
FIG. 7A is a perspective view of a main portion of the lock mechanism of the mounting apparatus according to the first exemplary embodiment of the present disclosure.
Figure 7B:
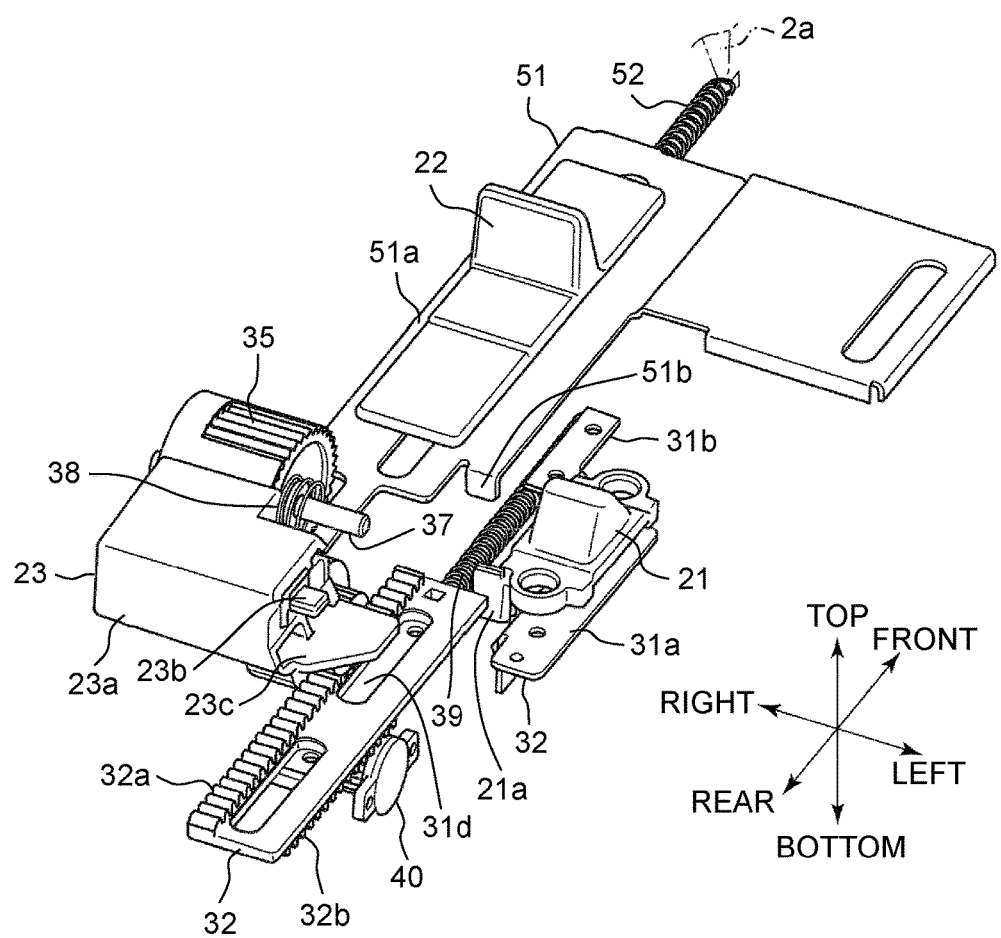
FIG. 7B is a perspective view of the main portion of the lock mechanism of the mounting apparatus according to the first exemplary embodiment of the present disclosure (the perspective view when viewed in a direction of arrow E shown in FIG. 7A)
Figure 7C:
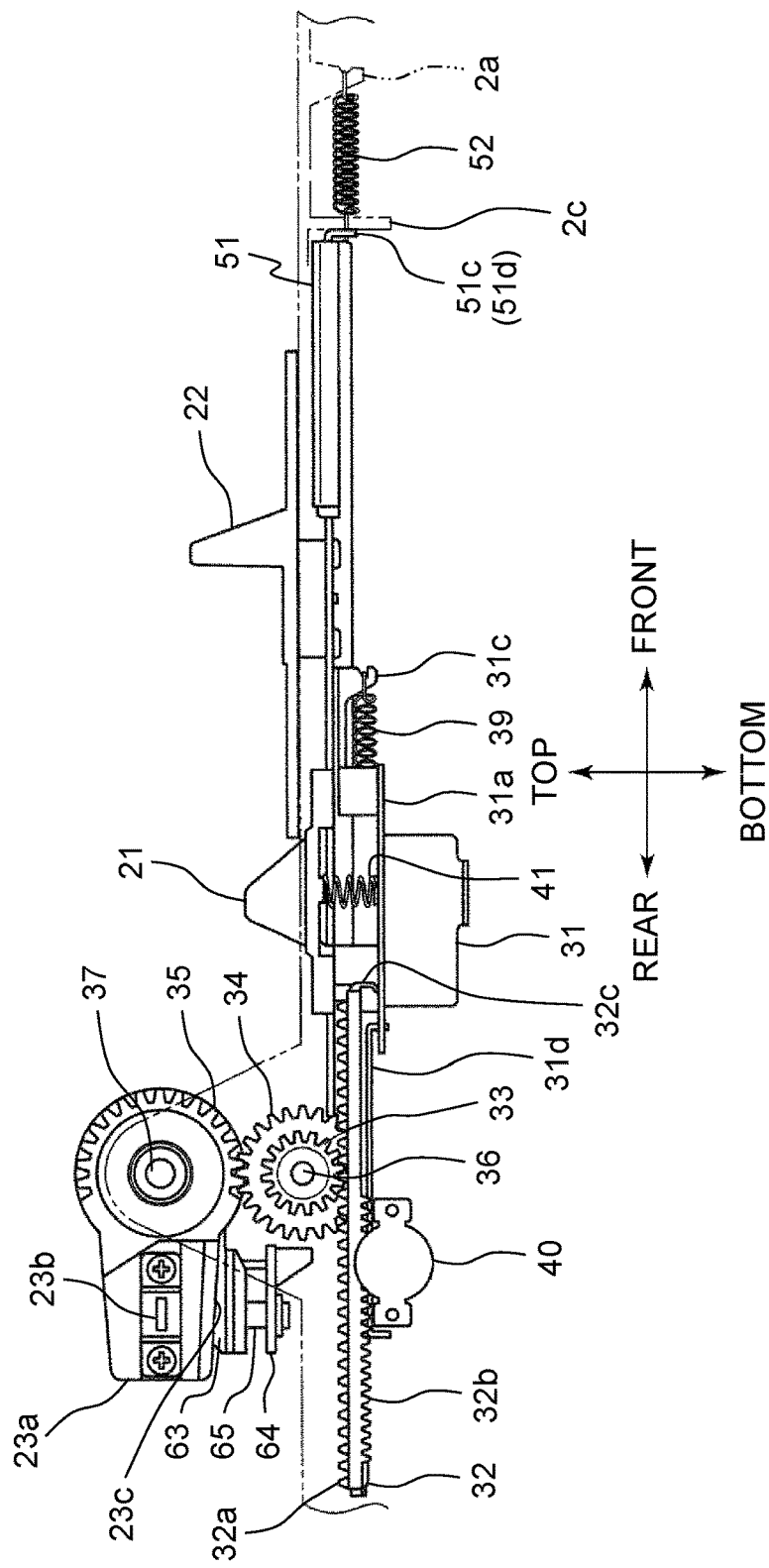
FIG. 7C is a side view of the main portion of the lock mechanism of the mounting apparatus according to the first exemplary embodiment of the present disclosure (the side view when viewed in a direction of arrow F shown in FIG. 7A)
Figure 7D:
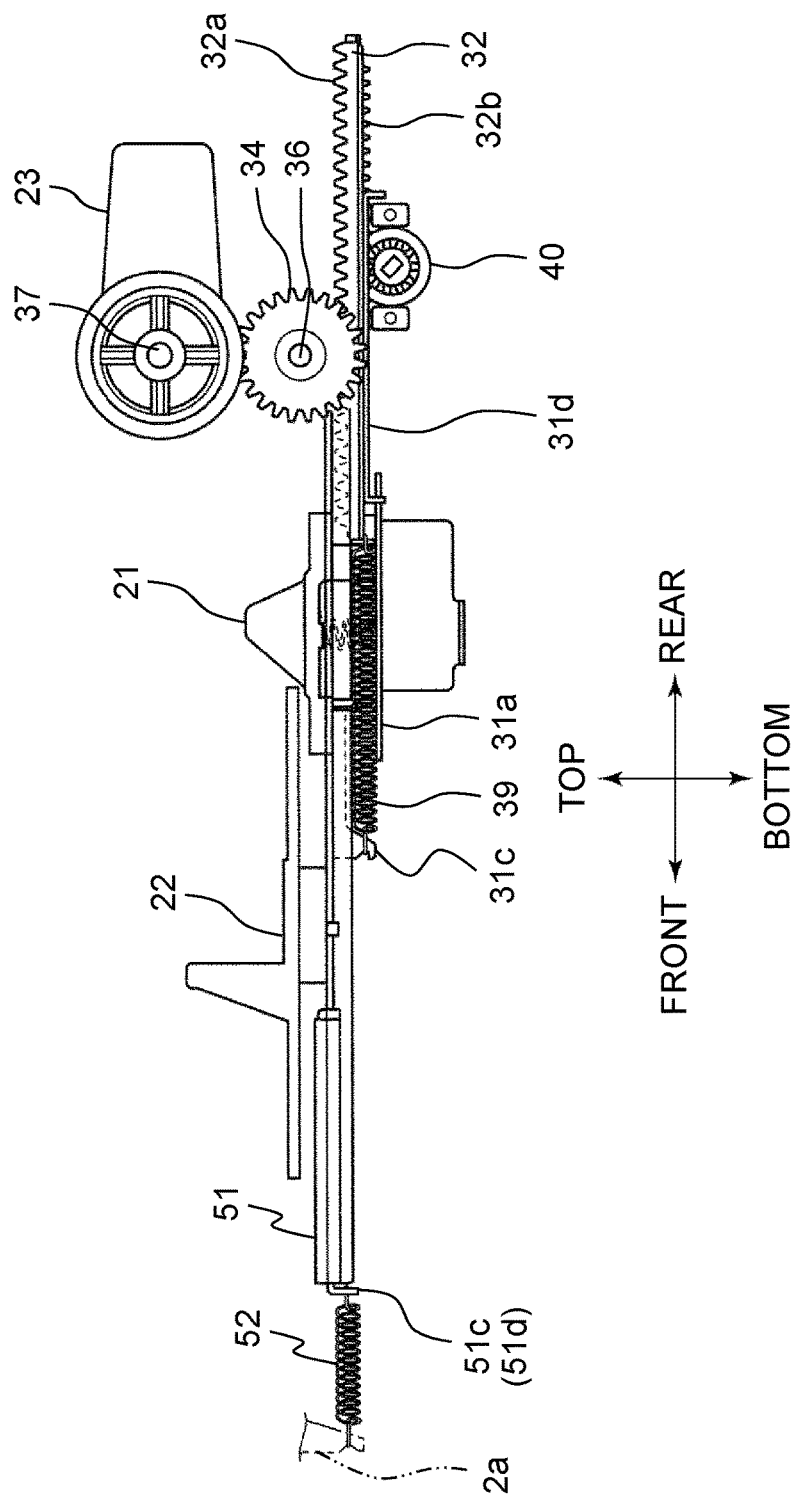
FIG. 7D is a side view of the main portion of the lock mechanism of the mounting apparatus according to the first exemplary embodiment of the present disclosure (the side view when viewed in a direction of arrow G shown in FIG. 7A)

FIG. 7A is a perspective view of a main portion of the lock mechanism of the mounting apparatus according to the first exemplary embodiment of the present disclosure. FIG. 7B is a perspective view of the main portion of the lock mechanism of the mounting apparatus according to the first exemplary embodiment of the present disclosure (the perspective view when viewed in a direction of arrow E shown in FIG. 7A). FIG. 7C is a side view of the main portion of the lock mechanism of the mounting apparatus according to the first exemplary embodiment of the present disclosure (the side view when viewed in a direction of arrow F shown in FIG. 7A). FIG. 7D is a side view of the main portion of the lock mechanism of the mounting apparatus according to the first exemplary embodiment of the present disclosure (the side view when viewed in a direction of arrow G shown in FIG. 7A).

First moving mechanism 30 is a mechanism for allowing locking member 23 to move to a locking-target hole side position based on a movement of movable projection member 21 in the apparatus thickness direction.

[1-3-3-1. Components of First Moving Mechanism]

First moving mechanism 30 includes fixing member 31, gear member 32, first gear 33, second gear 34, third gear 35, first shaft 36, second shaft 37, first spring 38, second spring 39, dumper 40, and third spring 41.

Fixing member 31 is fixed to housing 2 with screws (not shown) so as to be immovable with respect to housing 2. Fixing member 31 includes main body portion 31a, rearward extending portion 31b, spring lock 31c, and forward extending portion 31d. Main body portion 31a is a plate portion approximately in parallel to mount 11 of housing 2. Rearward extending portion 31b has a shape extending rearward from main body portion 31a. Spring lock 31c is formed at a rear end of rearward extending portion 31b. Forward extending portion 31d has a shape extending forward from main body portion 31a.

Gear member 32 is supported by housing 2 via a gear member support portion (not shown) added to forward extending portion 31d of fixing member 31 so as to be movable in parallel to the apparatus depth direction. Gear member 32 includes first gear portion 32a on its upper face and second gear portion 32b on its lower face. At the front end of gear member 32, spring lock 32c is formed for locking an end of second spring 39.

First shaft 36 extends in the apparatus width direction. First shaft 36 is supported behind operating member 22 by a left and right pair of support portions (not shown) provided on housing 2.

Second shaft 37 lies above first shaft 36, and extends in the apparatus width direction. Second shaft 37 is supported by a left and right pair of support portions 14L, 14R (see FIG. 6D).

First gear 33 and second gear 34 are configured to be revolvable about first shaft 36. First gear 33 and second gear 34 join to each other so as not to be relatively revolvable. A diameter of first gear 33 is smaller than a diameter of second gear 34. First gear 33 engages with first gear portion 32a of gear member 32 so that first gear 33 and first gear portion 32a configure a rack and pinion relationship.

Third gear 35 and locking member 23 are integrally formed at a bottom part of main body portion 23a of locking member 23. Third gear 35 is configured to be revolvable about second shaft 37, as well as to be movable in parallel to revolving axis center AY of second shaft 37. Third gear 35 is engaging with second gear 34.

First spring 38 is disposed on second shaft 37 so that its stretching direction conforms to the apparatus width direction. First spring 38 has an end abutting a left side of third gear 35 and another end abutting a right side of the support portion, and biases third gear 35 rightward in the apparatus width direction.

Second spring 39 is disposed so that its stretching direction conforms to the apparatus depth direction. Second spring 39 has one end locked to spring lock 31c of fixing member 31 and another end locked to spring lock 32c of gear member 32, and pulls gear member 32 forward in the apparatus depth direction.

Dumper 40 includes a gear (not shown) engaging with second gear portion 32b of gear member 32 and a dumper portion for reducing a revolving speed of the gear, and reduces a moving speed of gear member 32 in the apparatus depth direction.

Third spring 41 is disposed so that its stretching direction approximately conforms to the apparatus thickness direction. Third spring 41 has an end locked to a spring lock (not shown) provided to main body portion 31a of fixing member 31 and another end locked to a spring lock (not shown) of movable projection member 21, and biases and causes movable projection member 21 to project upward from the upper face of mount 11.

[1-3-3-2. Positional Relationships Among Components, and Others]

A positional relationship between and shapes of gear member 32 and vertical wall 21a of movable projection member 21 have been set so that: (1) when movable projection member 21 lies at the upward projection position, and gear member 32 moves forward in the apparatus depth direction, the front end of gear member 32 abuts vertical wall 21a of movable projection member 21, and (2) when movable projection member 21 lies at the evacuation position, and gear member 32 moves forward in the apparatus depth direction, the front end of gear member 32 does not abut vertical wall 21a of movable projection member 21. The position of gear member 32 in the apparatus depth direction when abutting as described in (1) is achieved refers in here to an "initial position" of gear member 32.

[1-3-3-3. Operation]

With the above described configuration, (1) when movable projection member 21 lies at the upward projection position, gear member 32 pulled by second spring 39 moves forward in the apparatus depth direction. Upon gear member 32 moves to the initial position, the front end of gear member 32 abuts vertical wall 21a of movable projection member 21, and gear member 32 is restricted from further moving forward. When gear member 32 lies at the initial position, main body portion 23a of locking member 23 is revolved approximately 90 degrees and inclined rearward in the apparatus thickness direction. This can be achieved by appropriately setting engagements of first gear portion 32a of gear member 32, first gear 33, second gear 34, and third gear 35.

On the other hand, (2) when movable projection member 21 lies at the evacuation position, gear member 32 is not restricted from moving forward from the initial position. When gear member 32 pulled by second spring 39 moves forward in the apparatus depth direction, movable projection member 21 lying at the evacuation position does not cause the front end of gear member 32 to abut vertical wall 21a of movable projection member 21. Gear member 32 can therefore move forward from the initial position. First gear portion 32a of gear member 32 therefore moves further forward from a position when movable projection member 21 lies at the upward projection position. When first gear portion 32a of gear member 32 moves forward, first gear 33 engaging with first gear portion 32a of gear member 32, second gear 34 joined to first gear 33 so as not to be relatively revolvable, and third gear 35 engaging with second gear 34 revolve together. Locking member 23 joined to third gear 35 therefore revolves forward about second shaft 37. As will be described later, when abutting portion 23c of locking member 23 abuts second housing 120, locking member 23 is then restricted from revolving. Third gear 35 locked to locking member 23, second gear 34 engaging with third gear 35, and first gear 33 joined to second gear 34 so as not to be relatively revolvable are therefore restricted from revolving together. Gear member 32 is therefore restricted from further moving forward. When electronic device 100 is not mounted on mount 11, and movable projection member 21 is pressed down to the evacuation position with a finger of a user, for example, abutting portion 23c of locking member 23 does not abut second housing 120, and, in this case, gear member 32 moves forward in the apparatus depth direction until the front end of gear member 32 abuts vertical wall 51b of movable plate 51 described later. In conjunction with this movement, first gear 33, second gear 34, third gear 35, and locking member 23 revolve together.

[1-3-4. Second Moving Mechanism]

Second moving mechanism 50 is a mechanism for allowing locking member 23 to move to the initial position based on a movement of operating member 22 in the apparatus depth direction.

[1-3-4-1. Components of Second Moving Mechanism]

Second moving mechanism 50 includes movable plate 51 and fourth spring 52, in addition to, as described above, gear member 32, first gear 33, second gear 34, third gear 35, first shaft 36, second shaft 37, first spring 38, second spring 39, and dumper 40.

Operating member 22 is fixed to movable plate 51 with screws, for example.

Movable plate 51 is supported by housing 2 via a movable plate support portion (not shown) so as to be movable in parallel in the apparatus depth direction. Movable plate 51 includes main body portion 51a, vertical wall 51b, and spring lock 51c.

Fourth spring 52 is disposed so that its stretching direction conforms to the apparatus depth direction. Fourth spring 52 has an end locked to spring lock 2a of housing 2 and another end locked to spring lock 51c of movable plate 51, and pulls movable plate 51 forward in the apparatus depth direction.

The configuration of other members configuring second moving mechanism 50 has been described above.

[1-3-4-2. Positional Relationships Among Components, and Others]

A positional relationship between and shapes of gear member 32 and vertical wall 51b of movable plate 51 have been set so that, when gear member 32 and movable plate 51 relatively move in the apparatus depth direction so as to approach each other, the front end of gear member 32 and vertical wall 51b of movable plate 51 abut each other.

Movable plate 51 is pulled by fourth spring 52 forward in the apparatus depth direction. Movable plate 51 is configured so that, when no operation for moving operating member 22 is performed, vertical wall 51d provided at a front end of the movable plate abuts abutting portion 2c provided to housing 2 (see FIG. 7C). An operation for moving operating member 22 refers to an operation for moving operating member 22 rearward in the apparatus depth direction.

Movable plate 51 is therefore restricted from further moving forward. A position of movable plate 51 in the apparatus depth direction when its movement is restricted as described above refers to an "initial position" of movable plate 51. Operating member 22 fixed to movable plate 51 is at this time also restricted from further moving forward. A position of operating member 22 in the apparatus depth direction when its movement is restricted as described above refers to an "initial position" of operating member 22.

[1-3-4-3. Operation]

When gear member 32 lies at the initial position, and operating member 22 is moved rearward in the apparatus depth direction by at least a predetermined amount against a biasing force of fourth spring 52, movable plate 51 moves rearward in the apparatus depth direction together with operating member 22. When vertical wall 51b at a rear end of movable plate 51 abuts the front end of gear member 32 lying at the initial position, and movable plate 51 further moves rearward, gear member 32 also moves together rearward. By moving operating member 22 rearward, gear member 32 can therefore be moved rearward in the apparatus depth direction. Accordingly, first gear 33 engaging with first gear portion 32a of gear member 32, second gear 34 joined to first gear 33 so as not to be relatively revolvable, and third gear 35 engaging with second gear 34 revolve together. Locking member 23 joined to third gear 35 therefore revolves rearward about second shaft 37. When gear member 32 is moved rearward in the apparatus depth direction farther than vertical wall 21a of movable projection member 21, an overlap between gear member 32 and vertical wall 21a of movable projection member 21 in the apparatus thickness direction disappears, and thus, movable projection member 21 restricted from moving upward by gear member 32 moves from the evacuation position to the upward projection position.

After that, when a user has released his or her hand from operating member 22, operating member 22 and movable plate 51 are pulled forward by a tensile force of fourth spring 52 to return to respective initial positions. On the other hand, while gear member 32 pulled forward by a tensile force of second spring 39 moves forward, since third spring 41 has caused movable projection member 21 to project to the upward projection position, gear member 32 and vertical wall 21a of movable projection member 21 abut each other. Gear member 32 is therefore restricted from further moving forward, i.e., farther forward than the initial position of gear member 32. Accordingly, gear member 32 is held at the initial position of gear member 32.

[1-3-5. Third Moving Mechanism]

Figure 8A:
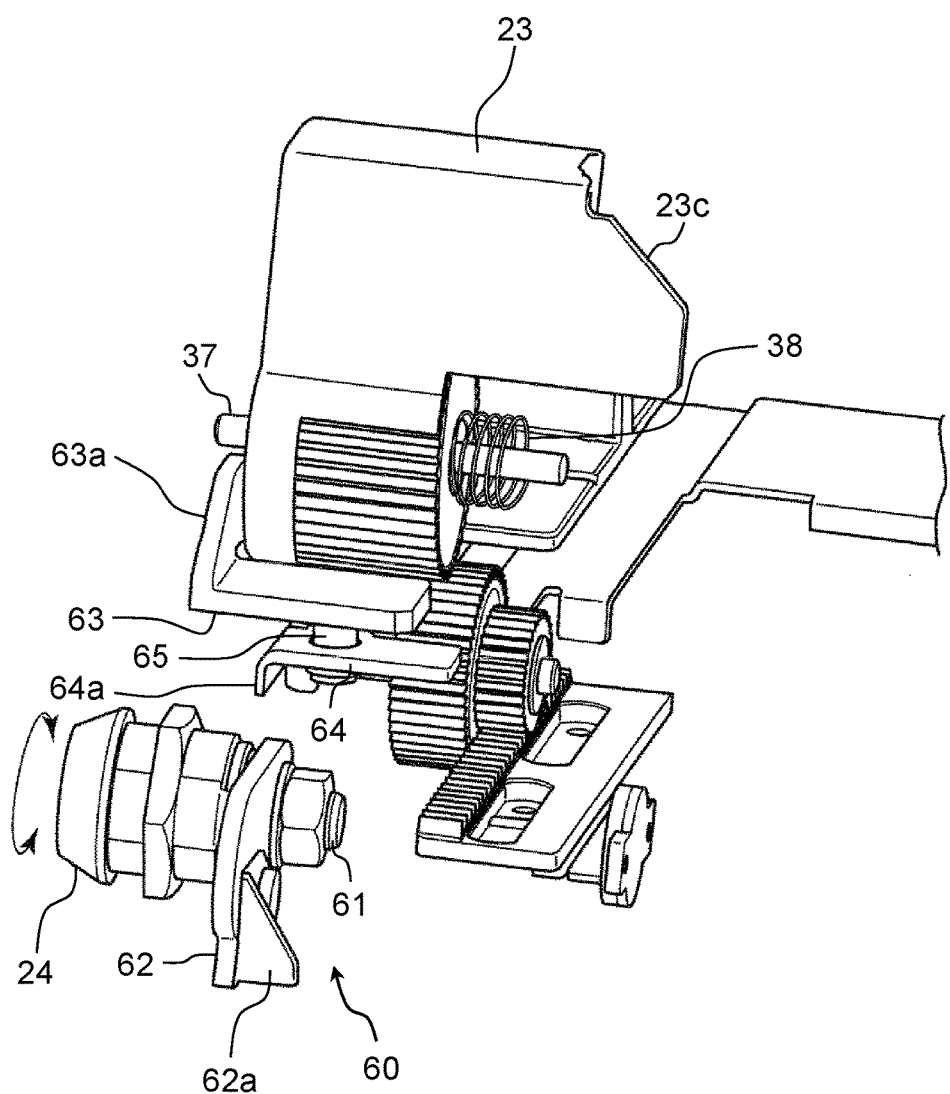
FIG. 8A is an enlarged perspective view of an area around the locking member of the lock mechanism of the mounting apparatus according to the first exemplary embodiment of the present disclosure (the enlarged perspective view when viewed in the direction of arrow E shown in FIG. 7A) (in an unlocked state)
Figure 8A:
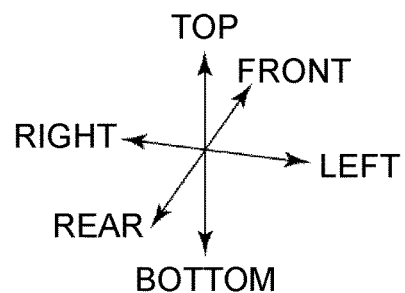
Figure 8B:
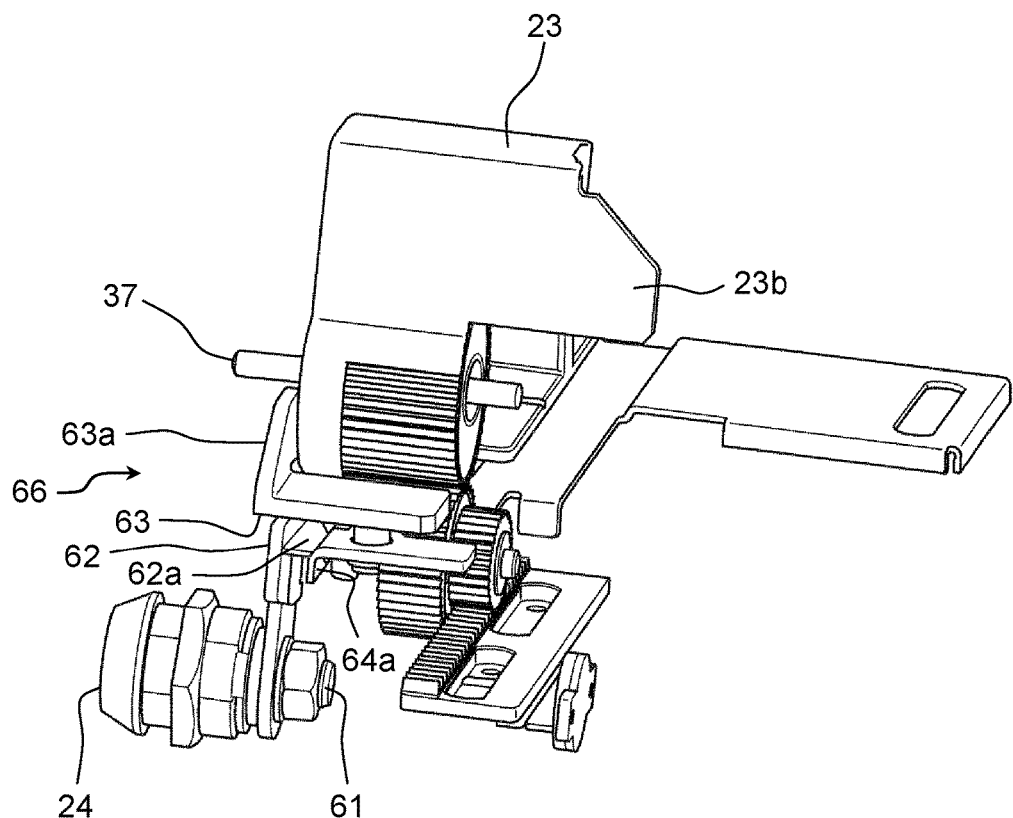
FIG. 8B is an enlarged perspective view of the area around the locking member of the lock mechanism of the mounting apparatus according to the first exemplary embodiment of the present disclosure (the enlarged perspective view when viewed in the direction of arrow E shown in FIG. 7A) (in a locked state)
Figure 8B:
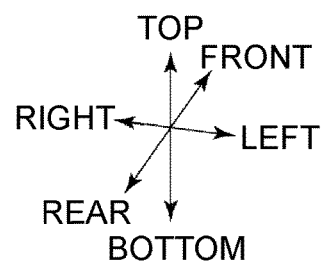

FIG. 8A is an enlarged perspective view of an area around the locking member of the lock mechanism of the mounting apparatus according to the first exemplary embodiment of the present disclosure (the enlarged perspective view when viewed in the direction of arrow E shown in FIG. 7A) (in an unlocked state). FIG. 8B is an enlarged perspective view of the area around the locking member of the lock mechanism of the mounting apparatus according to the first exemplary embodiment of the present disclosure (the enlarged perspective view when viewed in the direction of arrow E shown in FIG. 7A) (in a locked state).

Third moving mechanism 60 is a mechanism for moving, in response to a locking operation of cylinder lock 24 using a key, locking member 23 in the apparatus width direction between a locking-target hole side position and a locking position.

Third moving mechanism 60 includes shaft portion 61, revolving plate 62, first L-shaped member 63, second L-shaped member 64, and joining member 65.

Shaft portion 61 is a revolving shaft portion of cylinder lock 24.

Revolving plate 62 has an end joined to shaft portion 61. Revolving plate 62 has another end fixed with abutting plate 62a. Abutting plate 62a is provided vertical to revolving plate 62, and lies behind shaft portion 61 at an initial state. In the initial state, an end of abutting plate 62a, which faces inward in the apparatus width direction, is inclined so as to lie inward in the apparatus width direction as the end extends downward in the apparatus thickness direction.

First L-shaped member 63 includes vertical wall 63a at its end facing outward in the apparatus width direction, and has a shape formed in an approximately L shape when viewed in the apparatus depth direction. vertical wall 63a is disposed outside of third gear 35 in the apparatus width direction. Third gear 35 is biased by first spring 38 outward in the apparatus width direction, and a side of third gear 35, which faces outward in the apparatus width direction, abuts vertical wall 63a.

Second L-shaped member 64 includes vertical wall 64a at an end facing outward in the apparatus width direction, and has a shape formed in an approximately L-shape when viewed in the apparatus depth direction.

Joining member 65 joins first L-shaped member 63 and second L-shaped member 64.

Joined body 66 formed of first L-shaped member 63 and second L-shaped member 64 joined to each other with joining member 65 is supported by housing 2 via a joined body support portion (not shown) so as to be movable in parallel in the apparatus width direction.

Revolving plate 62 is disposed to have a positional relationship where, when shaft portion 61 revolves 90 degrees counterclockwise from an initial position, an end lying inward in the apparatus width direction abuts vertical wall 64a of second L-shaped member 64 described later to move joined body 66 inward in the apparatus width direction. When joined body 66 moves inward in the apparatus width direction as described above, vertical wall 63a of first L-shaped member 63, which is abutting the side of third gear 35, which faces outward in the apparatus width direction, causes third gear 35 to move inward in the apparatus width direction. Locking member 23 integrated with third gear 35 therefore moves inward in the apparatus width direction.

[1-4. Action]

According to this exemplary embodiment, when electronic device 100 is mounted on mounting apparatus 1, first housing 110 of electronic device 100 is intermittently surrounded by the plurality of projections 12 disposed around mount 11. In this mounted state, first housing 110 is therefore restricted from moving in the apparatus width direction and the apparatus depth direction.

This exemplary embodiment is configured to lock locking member 23 described later to the right side of second housing 120 of electronic device 100 mounted on mounting apparatus 1. When electronic device 100 is mounted on mounting apparatus 1, and locking member 23 is locked to second housing 120, locking member 23 restricts second housing 120 from moving toward the apparatus thickness direction and the apparatus depth direction. For second housing 120, lower side 120S is fitted to the socket, and thus socket 130 covers lower side 120S from front, rear, left, and right. Second housing 120 is therefore also restricted from moving in the apparatus width direction.

Accordingly, when electronic device 100 is mounted on mounting apparatus 1, and locking member 23 is locked to second housing 120, both of first housing 110 and second housing 120, i.e., whole electronic device 100, cannot be moved from mounting apparatus 1.

This exemplary embodiment is further configured to be able to lock locking member 23 from moving in the apparatus width direction by operating cylinder lock 24 described later using a key when locking member 23 is locked to second housing 120. When locking member 23 is locked from moving in the apparatus width direction, locking member 23 is prevented from switching from the locked state to the unlocked state. Removing electronic device 100 from mounting apparatus 1 requires switching of locking member 23 to the unlocked state, and the switching of locking member 23 to the unlocked state requires operating cylinder lock 24 with a key. Accordingly, a third party, other than a user possessing a key required for operating cylinder lock 24, is not able to remove and take away electronic device 100 from mounting apparatus 1, and thus enhanced security against theft can be achieved.

An action (operation) of mounting apparatus 1 when a user mounts electronic device 100 on mount 11 of mounting apparatus 1, and locks cylinder lock 24, and an action (operation) of mounting apparatus 1 when the user unlocks cylinder lock 24, and operates operating member 22 to remove electronic device 100 locked to mounting apparatus 1 will now be described in order herein.

[1-4-1. Installation to Mounting Apparatus]

Figure 9A:
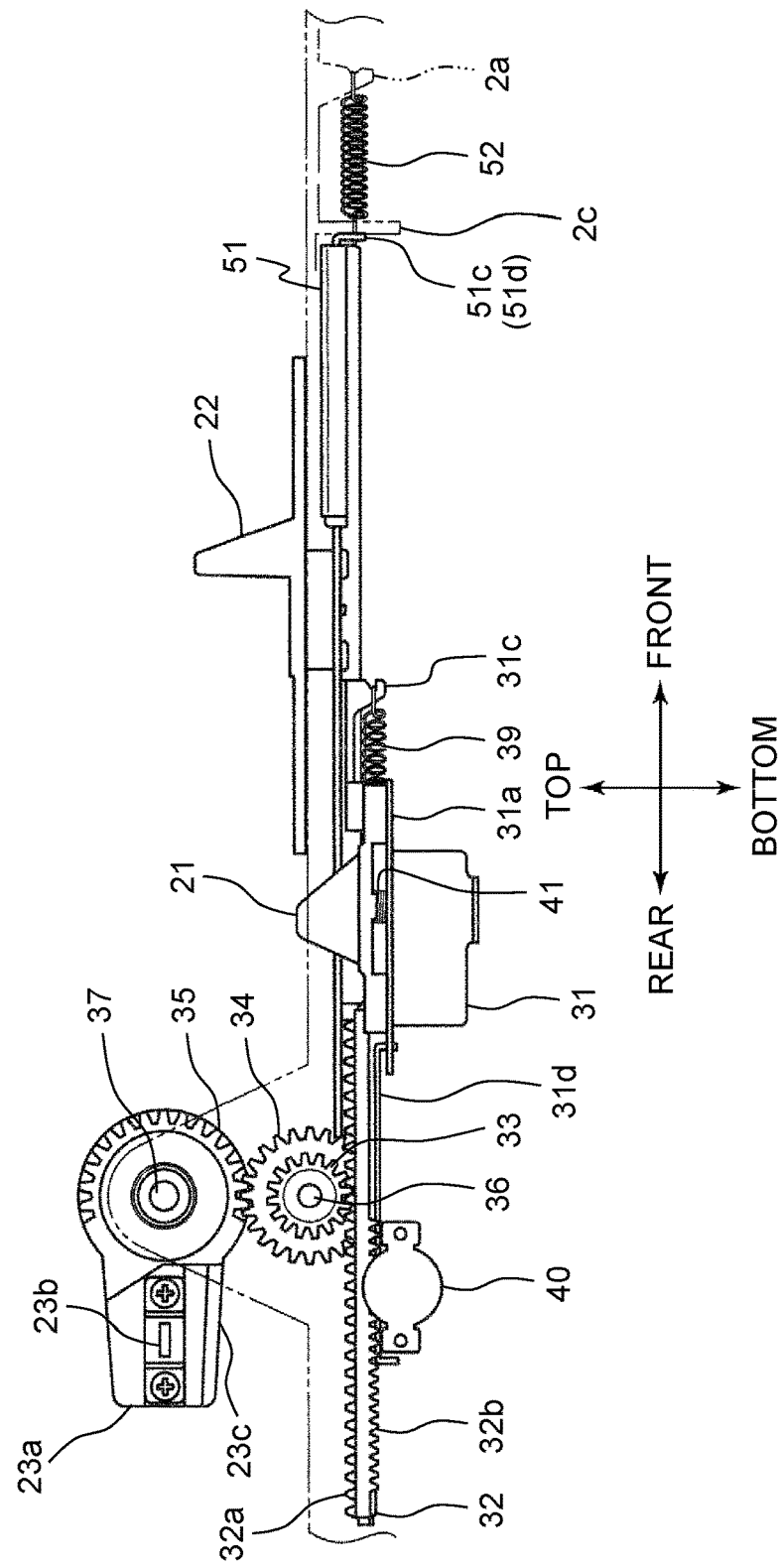
FIG. 9A is a view for describing operation of the lock mechanism of the mounting apparatus according to the first exemplary embodiment of the present disclosure (the view when viewed in the direction of arrow F shown in FIG. 7A)
Figure 9B:
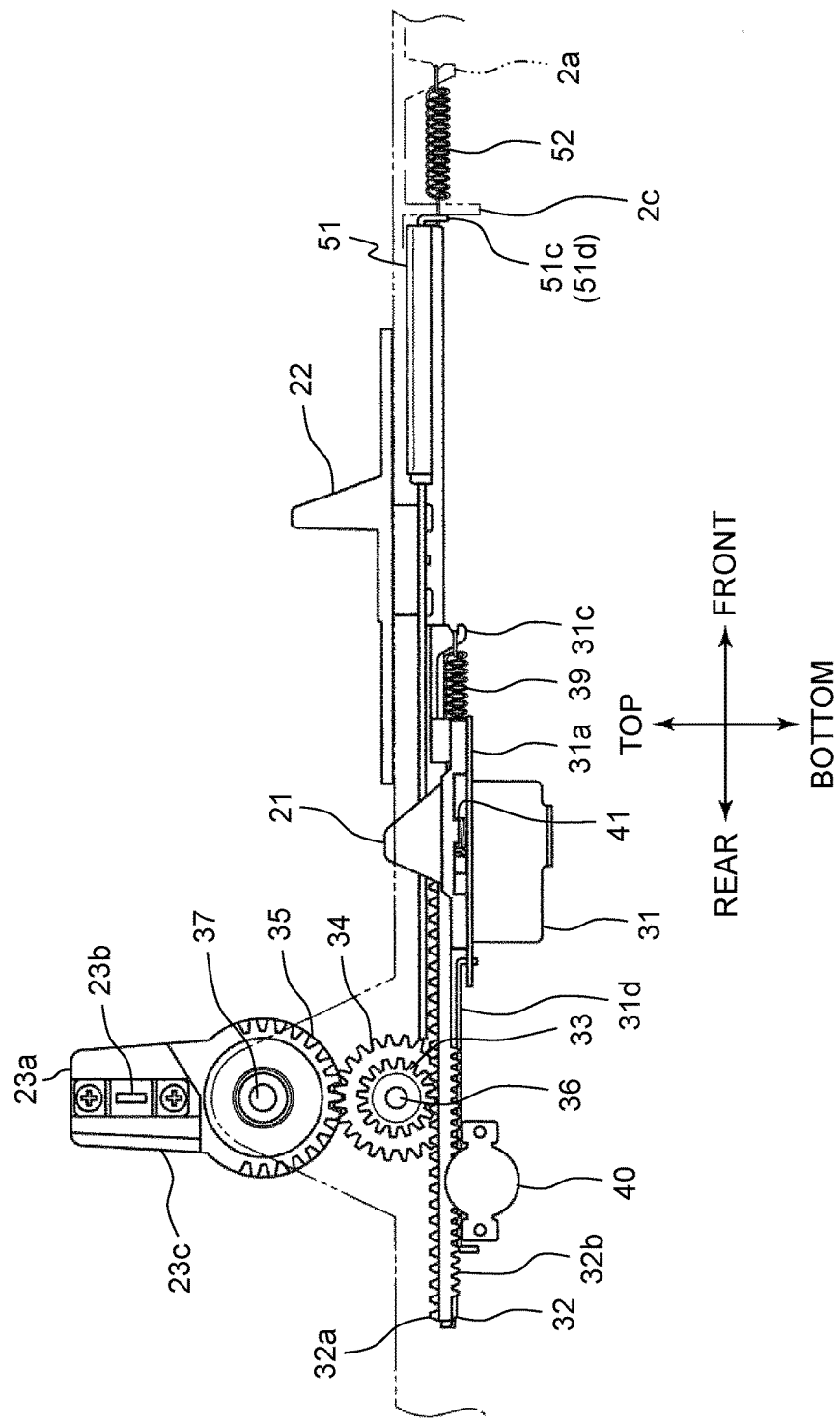
FIG. 9B is a view for describing the operation of the lock mechanism of the mounting apparatus according to the first exemplary embodiment of the present disclosure (the view when viewed in the direction of arrow F shown in FIG. 7A)

Operation of mounting apparatus 1 when a user mounts electronic device 100 on mount 11 of mounting apparatus 1, and locks cylinder lock 24 will now be described herein with reference to FIGS. 9A, 9B. FIGS. 9A, 9B are views for describing operation of the lock mechanism of the mounting apparatus according to the first exemplary embodiment of the present disclosure (the views when viewed in the direction of arrow F shown in FIG. 7A). Mounting apparatus 1 is assumed to be in an initial state before electronic device 100 is mounted on mounting apparatus 1. The initial state refers to a state when cylinder lock 24 lies at an unlocked position, locking member 23 lies at an unlocked position (i.e., gear member 32 lies at the initial position), movable projection member 21 lies at the upward projection position, and operating member 22 lies at the initial position.

In the initial state shown in FIG. 7C, when a user mounts electronic device 100 on mount 11 of mounting apparatus 1, as shown in FIG. 9A, movable projection member 21 is pressed down to the evacuation position. Vertical wall 21a of movable projection member 21 accordingly lowers below gear member 32, which frees gear member 32 and vertical wall 21a of movable projection member 21 abutted each other. Gear member 32 therefore moves forward in the apparatus depth direction by the tensile force of second spring 39. Accordingly, first gear 33 engaging with first gear portion 32a of gear member 32, second gear 34 joined to first gear 33 so as not to be relatively revolvable, and third gear 35 engaging with second gear 34 revolve together. Locking member 23 joining to third gear 35 therefore revolves clockwise about second shaft 37 from the initial position, as shown in FIG. 9B (when viewed from left in the apparatus width direction). When abutting portion 23c of locking member 23 abuts second housing 120, locking member 23 is restricted from revolving, and thus stops. Locking projection 23b of locking member 23 at this time lies, as shown in FIGS. 6C, 6D described above, away by a predetermined distance rightward in the apparatus width direction from locking-target hole 120a of second housing 120 and locking-target hole 130a of socket 130 of the electronic device.

Next, when the user uses the key to lock cylinder lock 24 of mounting apparatus 1, shaft portion 61 of cylinder lock 24 and revolving plate 62 fixed to shaft portion 61 revolve approximately 90 degrees from respective initial positions shown in FIG. 8A to respective positions shown in FIG. 8B. The end of revolving plate 62, which faces inward in the apparatus width direction, at this time abuts vertical wall 64a of second L-shaped member 64, and thus joined body 66 having second L-shaped member 64 moves inward in the apparatus width direction. When joined body 66 moves inward in the apparatus width direction, vertical wall 63a of first L-shaped member 63 and the side of third gear 35, which faces outward in the apparatus width direction, abutted to each other cause third gear 35 to move inward in the apparatus width direction against a biasing force of first spring 38. Locking member 23 integrated with third gear 35 therefore moves inward in the apparatus width direction, and accordingly locking projection 23b of locking member 23 enters into locking-target hole 120a of second housing 120 and locking-target hole 130a of socket 130 of electronic device 100 for locking to each other.

In this state, when the key is removed from cylinder lock 24, shaft portion 61 of cylinder lock 24 revolved approximately 90 degrees from the initial position is fixed (locked). In other words, when locking member 23 moves inward in the apparatus width direction, locking projection 23b of locking member 23 enters into locking-target hole 120a of second housing 120 and locking-target hole 130a of socket 130 of electronic device 100 for fixing (locking) to each other. Even when locking member 23 is at this time tried to move outward in the apparatus width direction, since locking member 23 is restricted from moving outward in the apparatus width direction by joined body 66, locking member 23 cannot be moved outward in the apparatus width direction. Accordingly, a third party, other than an authorized user, is not able to remove electronic device 100 from mounting apparatus 1. Enhanced security against theft of electronic device 100 can therefore be achieved.

[1-4-2. Removal from Mounting Apparatus]

Figure 10A:
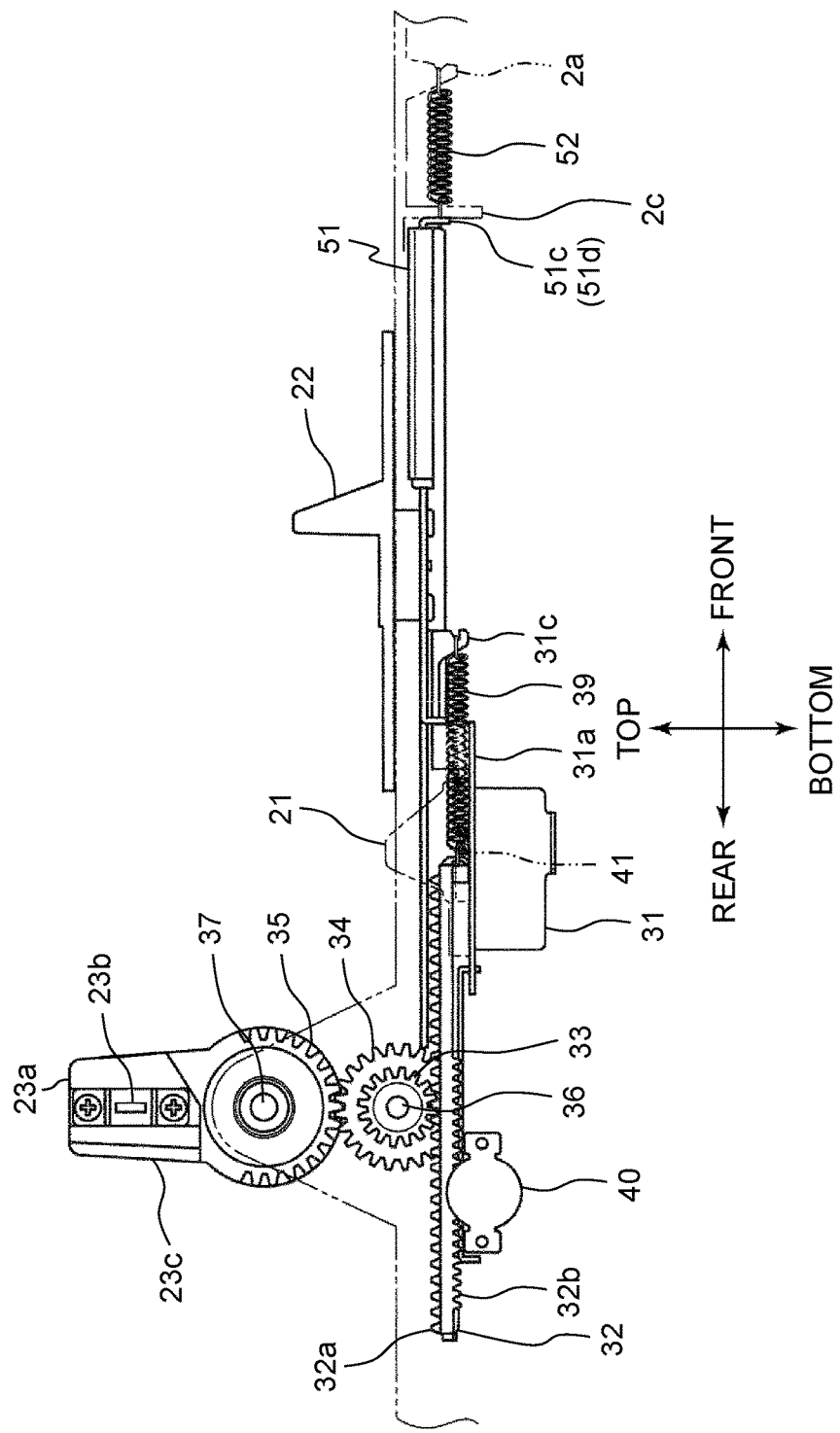
FIG. 10A is a view for describing operation of the lock mechanism of the mounting apparatus according to the first exemplary embodiment of the present disclosure (the view when viewed in the direction of arrow F shown in FIG. 7A)
Figure 10B:
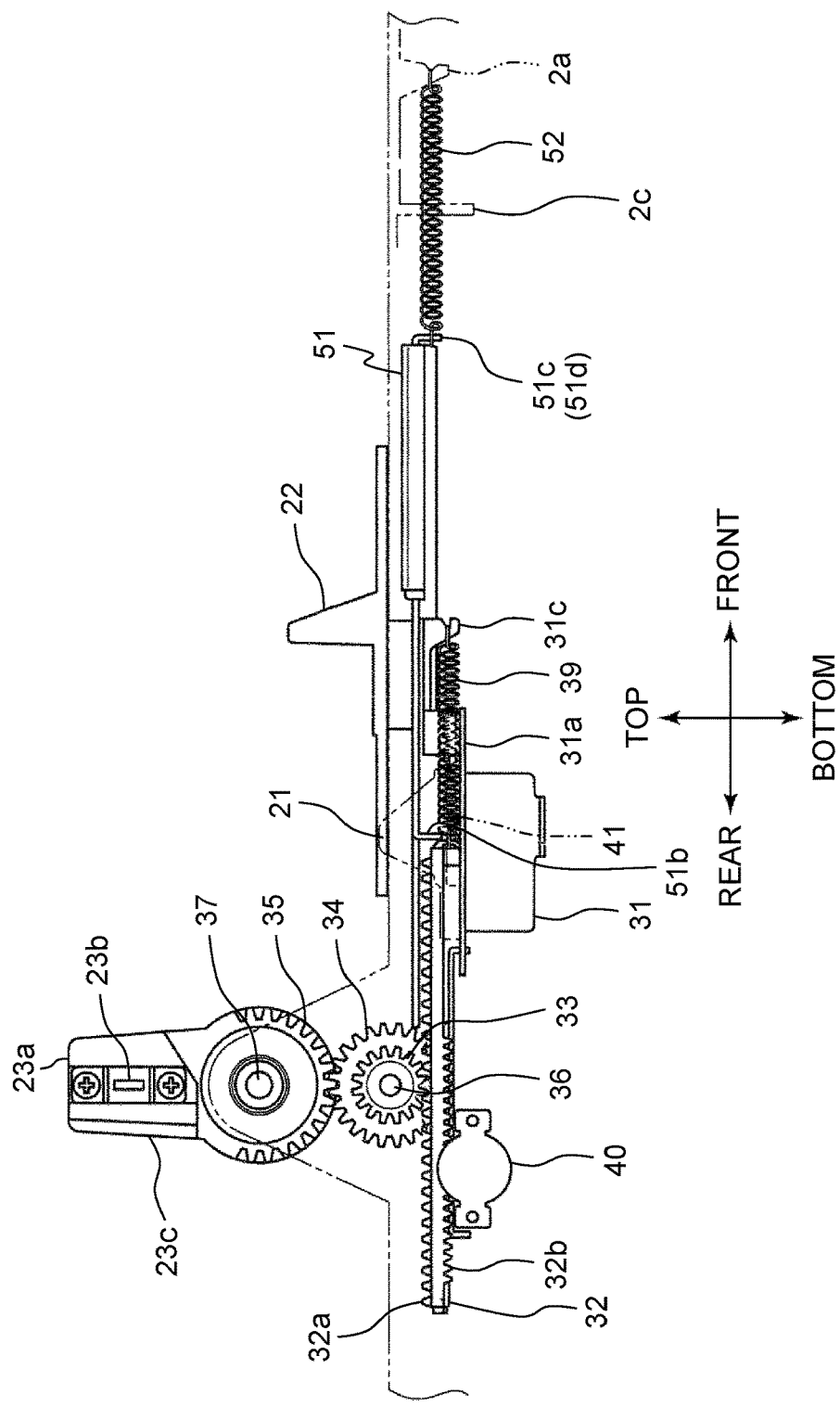
FIG. 10B is a view for describing the operation of the lock mechanism of the mounting apparatus according to the first exemplary embodiment of the present disclosure (the view when viewed in the direction of arrow F shown in FIG. 7A).

Next, operation when an authorized user unlocks cylinder lock 24 and operates operating member 22 to remove electronic device 100 locked to mounting apparatus 1 will now be described herein with reference to FIGS. 10A, 10B. FIGS. 10A, 10B are views for describing operation of the lock mechanism of the mounting apparatus according to the first exemplary embodiment of the present disclosure (the views when viewed from the direction of arrow F shown in FIG. 7A).

When the user uses the key to unlock cylinder lock 24, shaft portion 61 of cylinder lock 24 and revolving plate 62 fixed to shaft portion 61 revolve approximately 90 degrees from respective locked positions toward respective initial positions. Abutting between the end of revolving plate 62, which faces inward in the apparatus width direction, and vertical wall 64a of second L-shaped member 64 of joined body 66 is therefore canceled. When the abutting is canceled, since third gear 35 is biased outward in the apparatus width direction by the biasing force of first spring 38, joined body 66 and third gear 35 are caused to move outward in the apparatus width direction by the biasing force of first spring 38. Locking member 23 integrated with third gear 35 therefore moves outward in the apparatus width direction, and accordingly locking projection 23b of locking member 23 moves away from locking-target hole 120a of second housing 120 and locking-target hole 130a of socket 130 of electronic device 100 for unlocking from each other.

The user then lifts electronic device 100 upward to remove electronic device 100 from mount 11 of mounting apparatus 1.

Next, the user moves operating member 22 rearward in the apparatus depth direction against the biasing force of fourth spring 52. Movable plate 51 fixed to operating member 22 therefore moves rearward in the apparatus depth direction by a predetermined amount, and thus vertical wall 51b at the rear end of movable plate 51 abuts the front end of gear member 32 moved forward in the apparatus depth direction from the initial position. When operating member 22 is further moved rearward in the apparatus depth direction, gear member 32 moves rearward in the apparatus depth direction as vertical wall 51b of movable plate 51 moves. Accordingly, first gear 33 engaging with first gear portion 32a of gear member 32, second gear 34 joined to first gear 33 so as not to be relatively revolvable, and third gear 35 engaging with second gear 34 revolve together. Locking member 23 joining to third gear 35 therefore revolves about second shaft 37 toward the initial position.

Upon the front end of gear member 32 moves rearward farther than vertical wall 21a of movable projection member 21, abutting (overlapping) between gear member 32 and vertical wall 21a of movable projection member 21 in the apparatus thickness direction (the top-bottom direction) is canceled, and, as a result, movable projection member 21 that has been restricted so far from moving upward by the overlapping with gear member 32 moves by a biasing force of third spring 41 from the evacuation position to the upward projection position.

After that, when the user has released his or her hand from operating member 22, operating member 22 and movable plate 51 are pulled forward by the tensile force of fourth spring 52 to return to respective initial positions. Movable projection member 21 is held at the upward projection position by the biasing force of third spring 41. Gear member 32 pulled forward by the tensile force of second spring 39 moves forward, and thus the front end of gear member 32 abuts vertical wall 21a of movable projection member 21 held at the upward projection position. Gear member 32 is therefore restricted from moving forward farther than the initial position of gear member 32. Accordingly, gear member 32 is held at the initial position of gear member 32. In other words, the mounting apparatus is held in the initial state shown in FIG. 7B.

[2. Effects and Other Benefits]

[2-1. First Moving Mechanism, and Other Components]

Mounting apparatus 1 according to this exemplary embodiment is a mounting apparatus used for mounting electronic device 100. Electronic device 100 includes first housing 110 and second housing 120 including display 121 and the central processing unit. First housing 110 and second housing 120 are coupled so as to be relatively revolvable about revolving axis centers AX (the first revolving axis center).

Mounting apparatus 1 includes mount 11, locking member 23, movable projection member 21 (the moving member), and first moving mechanism 30 (the moving mechanism). Mount 11 is capable of mounting first housing 110 in a predetermined positional relationship with respect to mounting apparatus 1. Locking member 23 is provided so as to be movable between the initial position of locking member 23 and a position corresponding to a revolving position of second housing 120, and is capable of locking electronic device 100 with second housing 120. Movable projection member 21 (the moving member) is disposed so as to abut first housing 110 when first housing 110 is mounted on mount 11. When movable projection member 21 abuts first housing 110, movable projection member 21 moves in the apparatus thickness direction (the predetermined direction). When locking member 23 lies at the initial position, and movable projection member 21 moves in the apparatus thickness direction, first moving mechanism 30 (the moving mechanism) causes locking member 23 to move from the initial position to a position corresponding to a revolving position of second housing 120.

In mounting apparatus 1 according to this exemplary embodiment, electronic device 100 is therefore locked by locking member 23 with second housing 120 including display 121 and the central processing unit. Enhanced security against theft of second housing 120 recorded with important and other information can therefore be achieved.

In mounting apparatus 1 according to this exemplary embodiment, in particular, when first housing 110 is mounted on mount 11, locking member 23 can automatically move from the initial position to a position corresponding to a revolving position of second housing 120. Locking member 23 and locking-target holes 120a and 130a can therefore easily be positioned. When second housing 120 is revolved while electronic device 100 is mounted on mounting apparatus 1, and thus the revolving position of second housing 120 changes, locking member 23 follows the change.

In this exemplary embodiment, locking member 23 is configured to be lockable to second housing 120 in a predetermined direction only. Provided around mount 11 are projections 12 for restricting first housing 110 mounted on mount 11 from moving in the apparatus width direction and the apparatus depth direction (the predetermined directions).

When locking member 23 is locked to second housing 120 in the predetermined direction, projections 12 provided around mount 11 therefore restrict first housing 110 mounted on mount 11 from moving in directions parallel to the predetermined direction. By only performing a single engagement operation for second housing 120, both of first housing 110 and second housing 120 can be unremovable from mounting apparatus 1.

As a moving member, instead of movable projection member 21 that is disposed to abut first housing 110 when first housing 110 is mounted on mount 11, and that moves in the apparatus thickness direction (the predetermined direction) when movable projection member 21 abuts first housing 110, a moving member that moves through a user operation may be provided.

In electronic device 100 according to this exemplary embodiment, first housing 110 and second housing 120 are configured to be detachable.

According to this exemplary embodiment, when first housing 110 and second housing 120 are configured to be detachable, both of first housing 110 and second housing 120 can be unremovable from mounting apparatus 1 by performing only a single operation.

In this exemplary embodiment, locking member 23 is supported by housing 2 of mounting apparatus 1 so as to be revolvable about revolving axis center AY (a second revolving axis center). Revolving axis center AY is disposed on an axis center approximately identical to revolving axis centers AX of electronic device 100 when first housing 110 is mounted on mount 11. Locking member 23 includes abutting portion 23c. Abutting portion 23c abuts second housing 120 when locking member 23 is revolved about revolving axis center AY from the initial position to a position corresponding to a revolving position of second housing 120 to restrict locking member 23 from revolving further.

Locking member 23 therefore revolves about revolving axis center AY disposed on a position on an axis center approximately identical to revolving axis centers AX when first housing 110 is mounted on mount 11 to lock electronic device 100 with second housing 120. Second housing 120 can therefore be locked to mounting apparatus 1 with a simple structure. Since revolving axis centers AX and revolving axis center AY lie on an approximately identical axis center, second housing 120 can smoothly revolve even when second housing 120 is locked to mounting apparatus 1.

As a moving member, instead of the moving member that is disposed to abut first housing 110 when first housing 110 is mounted on mount 11, and that moves in the predetermined direction when the moving member abuts first housing 110, a moving member that moves through a user operation may be provided.

[2-2. Second Moving Mechanism]

Mounting apparatus 1 according to this exemplary embodiment is a mounting apparatus used for mounting electronic device 100. Electronic device 100 includes first housing 110 and second housing 120 including display 121 and the central processing unit. First housing 110 and second housing 120 are coupled so as to be relatively revolvable about revolving axis centers AX (the first revolving axis center).

Mounting apparatus 1 includes mount 11, locking member 23, operating member 22 (the moving member), and second moving mechanism 50 (the moving mechanism). Mount 11 is capable of mounting first housing 110 in a predetermined positional relationship with respect to mounting apparatus 1. Locking member 23 is provided so as to be movable between the initial position of locking member 23 and a position corresponding to a revolving position of second housing 120, and is capable of locking electronic device 100 with second housing 120. Operating member 22 moves in a predetermined direction through a user operation. When locking member 23 lies at a position corresponding to a revolving position of second housing 120, and operating member 22 moves in the predetermined direction, second moving mechanism 50 causes locking member 23 to move from the position corresponding to the revolving position of second housing 120 to the initial position of locking member 23.

In mounting apparatus 1 according to this exemplary embodiment, electronic device 100 is therefore locked by locking member 23 with second housing 120 including display 121 and the central processing unit. Enhanced security against theft or similar activities of second housing 120 recorded with important and other information can therefore be achieved.

In mounting apparatus 1 according to this exemplary embodiment, in particular, only operating the moving member can cause locking member 23 to automatically move from a position corresponding to a revolving position of second housing 120 to the initial position.

As a moving member, instead of operating member 22 (the moving member) that moves through a user operation, a moving member that is disposed so as to abut first housing 110 when first housing 110 is mounted on mount 11, and that moves in a predetermined direction when the moving member abuts first housing 110 may be provided. At this time, when locking member 23 lies at a position corresponding to a revolving position of second housing 120, and the moving member moves in a direction opposite to the predetermined direction, the moving mechanism causes locking member 23 to move from the position corresponding to the revolving position of second housing 120 to the initial position.

[2-3. Revolving Axis Center]

Mounting apparatus 1 according to this exemplary embodiment is a mounting apparatus used for mounting electronic device 100. Electronic device 100 includes first housing 110 and second housing 120 including display 121 and the central processing unit. First housing 110 and second housing 120 are coupled so as to be relatively revolvable about revolving axis centers AX (the first revolving axis center).

Mounting apparatus 1 includes mount 11 and locking member 23. Mount 11 is capable of mounting first housing 110 in a predetermined positional relationship with respect to mounting apparatus 1. Locking member 23 can lock electronic device 100 with second housing 120. Locking member 23 is provided so as to be revolvable about revolving axis center AY (the second revolving axis center) disposed at a position on an axis center approximately identical to revolving axis centers AX when first housing 110 is mounted on mount 11.

In mounting apparatus 1 according to this exemplary embodiment, electronic device 100 is therefore locked by locking member 23 with second housing 120 including display 121 and the central processing unit. Enhanced security against theft or similar activities of second housing 120 recorded with important and other information can therefore be achieved.

In mounting apparatus 1 according to this exemplary embodiment, in particular, locking member 23 revolves about revolving axis center AY disposed at a position on an axis center approximately identical to revolving axis centers AX when first housing 110 is mounted on mount 11. In other words, a revolving axis center of locking member 23 and a revolving axis center of second housing 120 lie on an approximately identical axis center. Electronic device 100 can therefore be locked on mounting apparatus 1 with a simple structure, regardless of a revolving position of second housing 120.

In this exemplary embodiment, mounting apparatus 1 is a mounting apparatus used for mounting electronic device 100. Mounting apparatus 1 further includes second spring 39 (a follow-up device) to cause, when mounting apparatus 1 and electronic device 100 are locked, and second housing 120 is revolved, locking member 23 to revolve as second housing 120 revolves.

Locking member 23 can therefore be caused to revolve about the second revolving axis center as second housing 120 revolves.

[2-4. Electronic Device]

Electronic device 100 according to this exemplary embodiment includes first unit 101 and second unit 102 including display 121 and the central processing unit. First unit 101 and second unit 102 are detachably coupled to configure electronic device 100.

Electronic device 100 is configured so that, when first unit 101 and second unit 102 are coupled, a housing of second unit 102 and a predetermined portion of first unit 101 adjoin.

At the adjoining portion, second unit 102 and first unit 101 are respectively provided with locking-target holes 120a, 130a that can be locked by single locking projection 23b of mounting apparatus 1.

In other words, first unit 101 is provided with first locking-target hole 130a, while second unit 102 is provided with second locking-target hole 120a. First locking-target hole 130a and second locking-target hole 120a are provided so as to be in communication with each other when first unit 101 and second unit 102 are coupled. Single locking projection 23b of mounting apparatus 1 can therefore be inserted into first locking-target hole 130a and second locking-target hole 120a. Inserting single locking projection 23b of mounting apparatus 1 into first locking-target hole 130a and second locking-target hole 120a locks first unit 101 and second unit 102 to mounting apparatus 1.

In electronic device 100 according to this exemplary embodiment, both of first unit 101 and second unit 102 can therefore be locked by single locking projection 23b of predetermined mounting apparatus 1. By locking electronic device 100 mounted on mounting apparatus 1, both of first unit 101 and second unit 102 can therefore be unremovable. Accordingly, in electronic device 100 where first unit 101 and second unit 102 are separable from each other, enhanced security against theft can be achieved.

In electronic device 100 according to the present disclosure, to lock electronic device 100 to mounting apparatus 1, a user is not required to lock first unit 101 and second unit 102. Accordingly, improved user friendliness can be achieved.

In this exemplary embodiment, first unit 101 includes first housing 110 configuring a main body, socket 130 capable of mounting second unit 102, and hinges 140 coupling first housing 110 and socket 130 so as to be relatively revolvable about revolving axis centers AX (the first revolving axis center). The predetermined portion of first unit 101, to which locking-target hole 130a is provided, is socket 130.

In other words, socket 130 provided to first unit 101 is provided with first locking-target hole 130a. First locking-target hole 130a is provided so as to be in communication with second locking-target hole 120a when second unit 102 is attached to socket 130.

Second unit 102 and socket 130 can therefore be locked by single locking projection 23b of predetermined mounting apparatus 1.

Other Exemplary Embodiments

As described above, the first exemplary embodiment has been described as illustration of the technology disclosed in the present application. However, the technology of the present disclosure is not limited to the first exemplary embodiment, but is applicable to another exemplary embodiment in which a change, a replacement, an addition, or an omission is appropriately made. A new exemplary embodiment can also be made by a combination of the components of the first exemplary embodiment.

The exemplary embodiment has been described above and exemplified as the technology of the present disclosure. The accompanying drawings and detailed description have been provided for this purpose.

Accordingly, the components described in the appended drawings and the detailed description include, in order to exemplifying the above described technology, not only essential components, but also components that are not essential. Therefore, it should not be immediately construed that these components that are not essential are essential even if the components are described in the appended drawings and the detailed description.

Since the above described exemplary embodiment is for exemplifying the technology of the present disclosure, various modifications, replacements, additions, and omissions can be made within the scope of the appended claims or of their equivalents.

The present disclosure is widely applicable to an electronic device including a first housing and a second housing including a display and a central processing unit, where the first housing and the second housing are coupled so as to be relatively revolvable about a first revolving axis center, and to a mounting apparatus for mounting the electronic device.

What is claimed is:

1. An electronic device comprising:
   a first unit; and
   a second unit including a display and a central processing unit, wherein
   the first unit and the second unit are detachably coupled to each other,
   the first unit is provided with a first locking-target hole,
   the second unit is provided with a second locking-target hole, and,
   when the first unit and the second unit are coupled to each other, the first locking-target hole, being a through hole, is in communication with the second locking-target hole,
   when the electronic device is locked by a locking device which can be separated form the electronic device, a locking projection of the locking device extends through the first locking-target hole and locks the second locking-target hole, so as to prevent detachment of the second unit from the first unit.

2. The electronic device according to claim 1, wherein the first unit includes a housing configuring a main body, a socket capable of attaching the second unit, and a hinge coupling the housing and the socket so as to be relatively revolvable about a first revolving axis center, and
   the first locking-target hole is provided on the socket.

3. The electronic device according to claim 1, wherein the locking device is provided on a mounting apparatus on which the electronic device is mounted when the locking device locks the electronic device.

* * * * *